US012700101B2

(12) United States Patent
Jemaa et al.

(10) Patent No.: US 12,700,101 B2
(45) Date of Patent: Aug. 4, 2026

(54) MACHINE-LEARNING BASED SEGMENTATION OF BIOLOGICAL OBJECTS IN MEDICAL IMAGES

(71) Applicant: Genentech, Inc., South San Francisco, CA (US)

(72) Inventors: Mohamed Skander Jemaa, San Francisco, CA (US); Yury Anatolievich Petrov, Half Moon Bay, CA (US); Xiaoyong Wang, Burlingame, CA (US); Nils Gustav Thomas Bengtsson, San Francisco, CA (US); Richard Alan Duray Carano, San Ramon, CA (US)

(73) Assignee: GENENTECH, INC., South San Francisco, CA (US)

( * ) Notice: Subject to any disclaimer, the term of this patent is extended or adjusted under 35 U.S.C. 154(b) by 254 days.

(21) Appl. No.: 18/669,407

(22) Filed: May 20, 2024

(65) Prior Publication Data

US 2024/0303822 A1 Sep. 12, 2024

Related U.S. Application Data

(63) Continuation of application No. PCT/US2022/080245, filed on Nov. 21, 2022.
(Continued)

(51) Int. Cl.
G06T 7/11 (2017.01)
G06T 7/33 (2017.01)

(52) U.S. Cl.
CPC ............... G06T 7/11 (2017.01); G06T 7/337 (2017.01); *G06T 2207/10081* (2013.01);
(Continued)

(58) Field of Classification Search
None
See application file for complete search history.

(56) References Cited

U.S. PATENT DOCUMENTS 10,762,636 B2 * 9/2020 Gering .................... G06T 19/20
11,043,296 B2 * 6/2021 Gering ..................... G06T 7/12
(Continued)

FOREIGN PATENT DOCUMENTS

CN 111127444 A 5/2020
WO 2019136349 A2 7/2019

OTHER PUBLICATIONS

International Preliminary Report on Patentability, issued May 2, 2024, for PCT Application No. PCT/US2022/080245, filed Nov. 21, 2022, 6 pages.
(Continued)

*Primary Examiner* — Helen Zong
(74) *Attorney, Agent, or Firm* — MORRISON & FOERSTER LLP

(57) ABSTRACT

In one embodiment, a method includes accessing a first scan image from a set of computed tomography (CT) scan images with each CT scan image being at a first resolution, generating a first downscaled image of the first scan image by resampling the first scan image to a second resolution that is lower than the first resolution, determining coarse segmentations corresponding to organs portrayed in the first scan image by first machine-learning models based on the first downscaled image, extracting segments of the first scan image based on the coarse segmentations with each extracted segment being at the first resolution, determining fine segmentations corresponding to the respective organs portrayed in the extracted segments by second machine-learning models based on the extracted segments, and generating a segmented image of the first scan image based on
(Continued)

the fine segmentations, wherein the segmented image comprises confirmed segmentations corresponding to the organs.

20 Claims, 23 Drawing Sheets

Related U.S. Application Data

(60)  Provisional application No. 63/282,038, filed on Nov. 22, 2021.

(52)  U.S. Cl.
CPC ............... *G06T 2207/20016* (2013.01); *G06T 2207/20084* (2013.01); *G06T 2207/20221* (2013.01); *G06T 2207/30096* (2013.01)

(56)                References Cited

U.S. PATENT DOCUMENTS

| | | |
|---|---|---|
| 11,263,754 B2 | 3/2022 | Gering |
| 2021/0125707 A1 | 4/2021 | Rusko |
| 2021/0312622 A1 | 10/2021 | Buckler |
| 2021/0334974 A1 | 10/2021 | Johnsson |

OTHER PUBLICATIONS

International Search Report and Written Opinion, mailed Mar. 27, 2023, for PCT Application No. PCT/US2022/080245, filed Nov. 21, 2022, 8 pages.
Lin, T.-Y. et al. (2017). "Focal Loss for Dense Object Detection," ICCV 2980-2988.

* cited by examiner

710

720

730

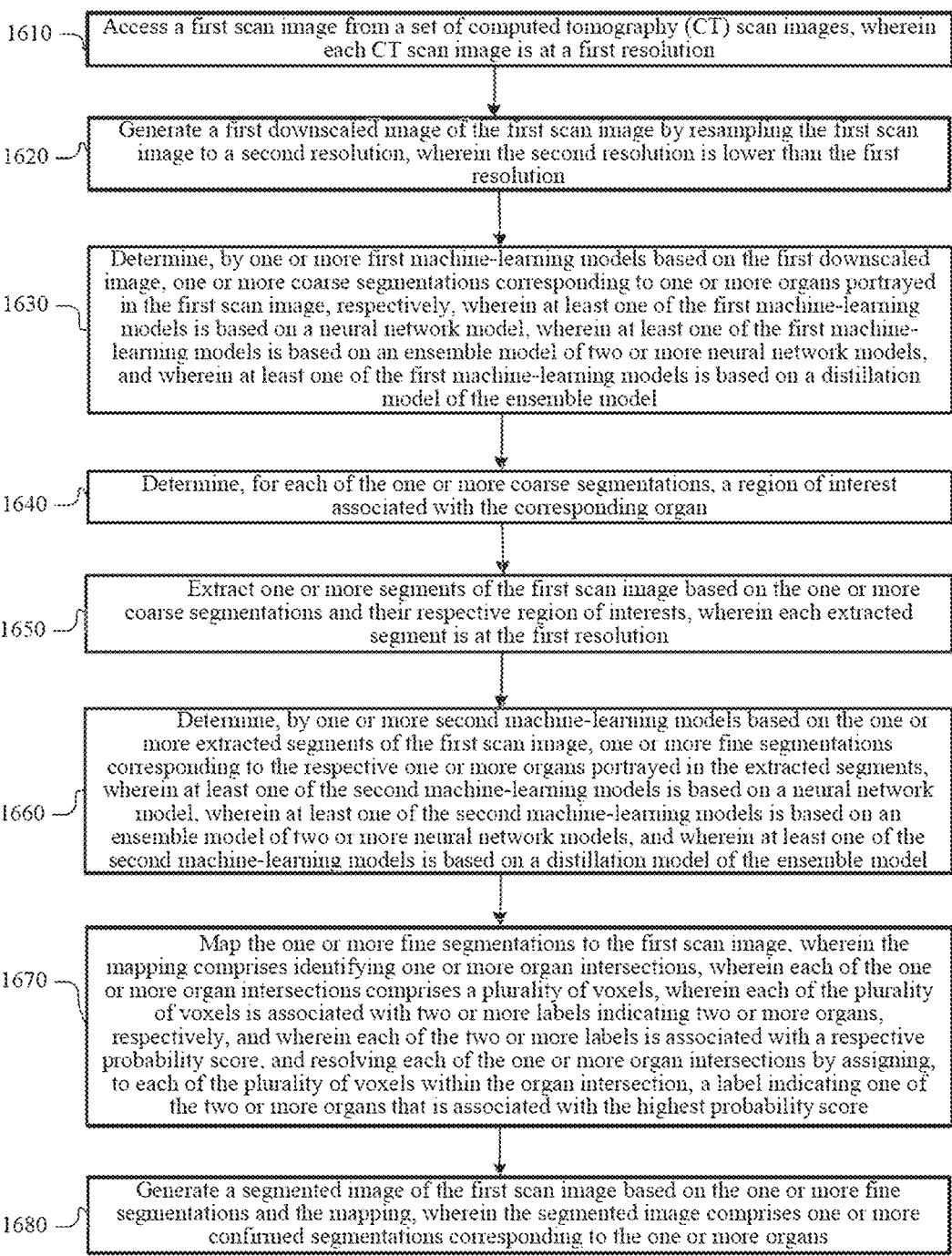

<u>1600</u>

1610 — Access a first scan image from a set of computed tomography (CT) scan images, wherein each CT scan image is at a first resolution 1620 — Generate a first downscaled image of the first scan image by resampling the first scan image to a second resolution, wherein the second resolution is lower than the first resolution 1630 — Determine, by one or more first machine-learning models based on the first downscaled image, one or more coarse segmentations corresponding to one or more organs portrayed in the first scan image, respectively, wherein at least one of the first machine-learning models is based on a neural network model, wherein at least one of the first machine-learning models is based on an ensemble model of two or more neural network models, and wherein at least one of the first machine-learning models is based on a distillation model of the ensemble model 1640 — Determine, for each of the one or more coarse segmentations, a region of interest associated with the corresponding organ 1650 — Extract one or more segments of the first scan image based on the one or more coarse segmentations and their respective region of interests, wherein each extracted segment is at the first resolution 1660 — Determine, by one or more second machine-learning models based on the one or more extracted segments of the first scan image, one or more fine segmentations corresponding to the respective one or more organs portrayed in the extracted segments, wherein at least one of the second machine-learning models is based on a neural network model, wherein at least one of the second machine-learning models is based on an ensemble model of two or more neural network models, and wherein at least one of the second machine-learning models is based on a distillation model of the ensemble model 1670 — Map the one or more fine segmentations to the first scan image, wherein the mapping comprises identifying one or more organ intersections, wherein each of the one or more organ intersections comprises a plurality of voxels, wherein each of the plurality of voxels is associated with two or more labels indicating two or more organs, respectively, and wherein each of the two or more labels is associated with a respective probability score, and resolving each of the one or more organ intersections by assigning, to each of the plurality of voxels within the organ intersection, a label indicating one of the two or more organs that is associated with the highest probability score 1680 — Generate a segmented image of the first scan image based on the one or more fine segmentations and the mapping, wherein the segmented image comprises one or more confirmed segmentations corresponding to the one or more organs

*FIG. 16*

MACHINE-LEARNING BASED SEGMENTATION OF BIOLOGICAL OBJECTS IN MEDICAL IMAGES

CROSS-REFERENCE TO RELATED APPLICATION(S)

This application is a continuation of International Application No. PCT/US2022/080245, filed on Nov. 21, 2022, which claims the benefit of U.S. Provisional Application No. 63/282,038, filed Nov. 22, 2021, the entire contents of each of which are incorporated herein by reference in their entirety.

FIELD OF THE INVENTION

The present disclosure relates to a system and methods for identification and segmentation of biological objects using medical images.

INTRODUCTION

Medical imaging (e.g., CT scans, x-rays or MRI scans) are widely used for tumor detection in order to aide in the diagnosis and treatment of cancers (e.g., lung cancer, breast cancer, etc.). In many instances, health-care professionals assess an efficacy of a drug and/or treatment regimen through measuring changes in a tumor size or volume. Response Evaluation Criteria in Solid Tumors (RECIST) is a standardized method to assess treatment response in cancer subjects, and is a part of the regulatory standard for new oncology drug approvals. RECIST requires a substantial amount of time from a trained professional (e.g., a radiologist). Specifically, an annotator is to manually (e.g., by a radiologist) identify up to five target lesions and up to 10 non-target lesions. The annotator is to identify the perimeter of each target lesion in each scan where a cross-section of the target lesion is depicted, and records cross-sectional diameters for each target lesion. A quantitative metric (e.g., sum of longest diameters) is then determined for all target lesions. Non-target lesions are assessed qualitatively, indicating whether the non-target lesion is observed in the scan(s), and if there are unequivocal changes. Scans can be collected at multiple time points, and metrics for the target and non-target lesions can be determined for each time point. Changes in the metrics over a time period can then be used to assess a degree to which a disease is progressing and/or being effectively treated.

However, RECIST includes several limitations. Namely, the method does not account for an entire disease "burden" since RECIST very frequently only measures a small subset (e.g., less than 5-10) of tumors for each subject. The technique is unable to precisely assess disease progression and/or a treatment efficacy for subjects with cancer that has metastasized to include a large number of lesions (e.g., more than 5 lesions), given that sizes of only up to 5 tumors are tracked. Furthermore, there is also inconsistency in the selection of target lesions due to variability of lesion selections, which causes significant intra- and inter-reader variability leading to differing assessments of tumor burden even within the same subject. For example, a different set of lesions may (e.g., inadvertently) be identified across different time points. Many tumors can additionally often have a heterogeneous appearance on CT and vary by location, size, and shape. For instance, lung lesions may be of cavitary or calcified type and bone metastases may (for example) take Lytic (destroys skeletal tissue) or Blastic (abnormal bone growth) form, where each lesion type is associated with different structural and visual appearance, such that due to the high variability in lesions, it is difficult to assess a stage of disease and/or each lesion of said lesion type without obtaining a full read. Thus, it would be advantageous to identify an automated technique that assesses tumor growth and/or metastasis using a more comprehensive data set and more objective techniques.

Summary of Particular Embodiments

Herein is provided a system and methods for identification and segmentation of biological objects using medical images.

CT-RECIST stipulates at most two target (measured) lesions per organ. Hence, there may be a need to learn organ masks to know the boundaries of the organ. There may be two types of lesions. One type of lesions is target lesions indicative of certain diseases. The other type of lesions is non targeted. Target lesions may be more important for diagnosis purposes and the difference among target lesions may have to be measured, e.g., by radiologists. One may hypothesize that machine-learning models, e.g., a neural network may be significantly more accurate in lesion segmentation if lesions appear as the only inhomogeneities in otherwise fairly homogeneous image texture. This may be achieved by masking out everything from the input image except for one organ as the inside of an organ may be more homogeneous than the CT scan image as a whole. On the other hand, CT scan images may be three dimensional, comprising a large amount of collections of slices. There may be not enough memory to load and process such large-scale images at full resolution from the computational perspective. Therefore, one may pass a CT scan image through a neural network organ-by-organ, which not only allows to use full resolution images, but also to focus the neural network on the range of CT values specific for each organ. Considering the requirement by RECIST and the computational issue, a neural network processing system may use an automated approach based on a segmentation model for effective organ segmentation. In particular embodiments, the neural network processing system may search for inhomogeneous areas in homogeneous organ mass, segment organs using the segmentation model, transform segmented organs back to CT reference frame, and resolve organ intersections. Although this disclosure describes segmenting particular objects by particular systems in particular manners, this disclosure contemplates segmenting any suitable object using any suitable policy in any suitable manner.

In particular embodiments, the neural network processing system may access a first scan image from a set of computed tomography (CT) scan images. Each CT scan image may be at a first resolution. The neural network processing system may then generate a first downscaled image of the first scan image by resampling the first scan image to a second resolution. The second resolution may be lower than the first resolution. Down-sampling the scan image may result in a technical advantage of computational efficiency as a down-sampled scan image may occupy less memory and may be also faster to load and process than a scan image with full resolution. In particular embodiments, the neural network processing system may determine, by one or more first machine-learning models based on the first downscaled image, one or more coarse segmentations corresponding to one or more organs portrayed in the first scan image, respectively. The neural network processing system may then extract one or more segments of the first scan image based on the one or more coarse segmentations, respectively. Each extracted segment may be at the first resolution. In particular embodiments, the neural network processing system may determine, by one or more second machine-learning models based on the one or more extracted segments of the first scan image, one or more fine segmentations corresponding to the respective one or more organs portrayed in the extracted segments. Using the first machine-learning models for coarse segmentations and the second machine-learning models for fine segmentations may results in one or more technical advantages. One technical advantage may include automating the segmentation process, which may be manual in most existing approaches. Another technical advantage may include aiding the radiologist's workflow by performing tumor/lesion detection and segmentation automation based on machine-learning models. Another technical advantage may include improved accuracy for segmentation as machine-learning models may be significantly more accurate in lesion segmentation if lesions appear as the only inhomogeneities in otherwise fairly homogeneous image texture. The neural network processing system may further generate a segmented image of the first scan image based on the one or more fine segmentations. The segmented image may comprise one or more confirmed segmentations corresponding to the one or more organs. The automated segmentation of each organ may result one or more technical advantages. One technical advantage may include improved tracking of lesions over time as each automatically segmented organ may provide a focused view capturing lesion progression and the improved tracking of lesions may further assist in medical analysis of certain diseases. Another technical advantage may include reducing the amount of required non-linear distortion and speeding up computations in lesion registration, as the neural network processing system 120 may register lesions on the per-organ basis instead of the per-scan basis after the organs are segmented.

BRIEF DESCRIPTION OF THE DRAWINGS

One or more drawings included herein are in color in accordance with 37 CFR § 1.84. The color drawings are necessary to illustrate the invention.

FIG. 16 illustrates an example method for organ segmentation.

DESCRIPTION

Figure 1A:
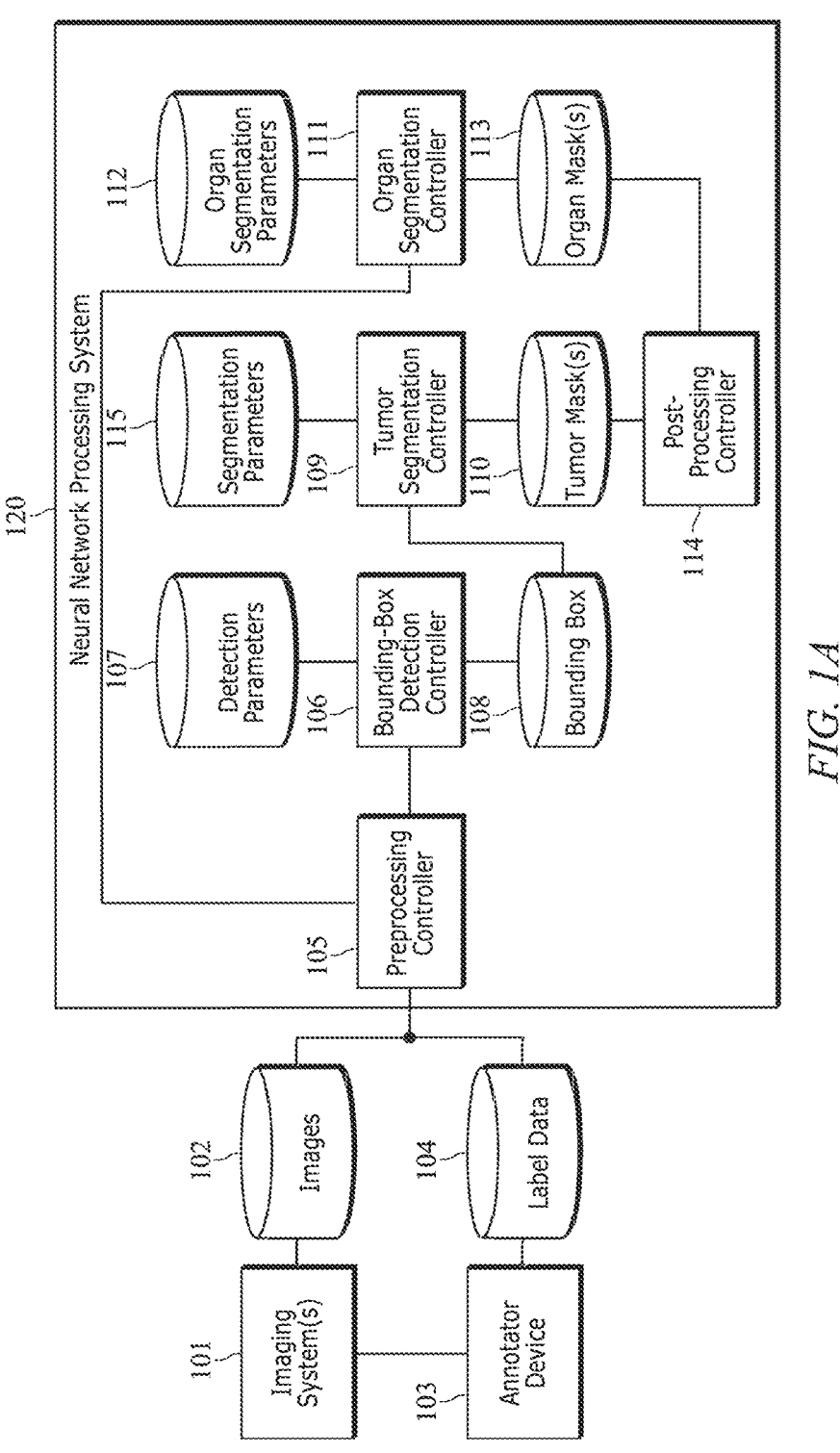
FIG. 1A illustrates an exemplary interaction system for using, collecting, and processing medical images using a multi-stage neural-network platform.

FIG. 1A illustrates an exemplary interaction system for using collecting and processing medical images in order to using a multi-stage neural-network platform. In this particular example, the interaction system is specifically configured to locate and segment depictions of tumor biological structures and organs within the medical images.

One or more imaging systems 101 (e.g., a CT machine, an MRI machine, and/or an x-ray machine) can be used to generate one or more sets of medical images 102 (e.g., CT, MRI, and/or x-ray images). Imaging system(s) 101 can be configured to iteratively adjust a focus and/or position as multiple images are collected, such that each image in a set of images is associated with a different depth, position and/or perspective relative to other images in the set. Imaging system 201 can include a light source (e.g., a motorized and/or x-ray source), a light detector (e.g., camera), a lens, an objective, a filter, a magnet, shim coils (e.g., to correct inhomogeneities in the magnetic field), a gradient system (e.g., to localize a magnetic-resonance signal) and/or an RF system (e.g., to excite a sample and detect a resulting nuclear magnetic resonance signal).

Each set of images 102 can correspond to an imaging session, session date and subject. The subject can include a human or animal subject. The subject may have been diagnosed with a particular disease (e.g., cancer) and/or have one or more tumors.

Each set of images 102 can depict an interior of a corresponding subject. In some instances, each image depicts at least a region of interest of the subject (e.g., one or more organs, a chest region, an abdominal region, and/or a pelvic region).

Each image of the set of images 102 may additionally have a same viewing angle, such that each depicts a plane that is parallel to other planes depicted in other images in the set. In some instances, each of the set of images may correspond to a different distance along an axis that is non-parallel to (e.g., perpendicular to) the plane. For example, the set of images 102 may correspond to a set of horizontal virtual slices that correspond to different positions along an anterior-posterior axis of the subject. The set of images 102 may be (e.g., collectively or individually) pre-processed. For example, pre-processing can include normalizing pixel intensities, aligning images to each other or to another reference point/image, cropping images to a uniform size, and/or adjusting a contrast to differentiate between light and dark pixels. In some instances, the set of images 102 may be processed to generate a 3-dimensional (3D) image structure. The 3D image structure may then be used to generate another set of images that correspond to a different angle for virtual slices.

Some medical images collected by at least one of imaging system(s) 101 can include training images that are to be included in a training data set to train one or more neural networks (e.g., a bounding-box detection network and a segmentation network). Training images may be associated with other subjects as compared to a subject for which the trained network(s) are used.

Each training image can have one or more characteristics of the medical images 102 described herein and can be associated with annotation data that indicates whether and/or where the image depicts a tumor and/or an organ. To identify this annotation data, an image collected by imaging system 101 can be availed to (e.g., transmitted to) an annotator device 103.

The image may be presented at annotator device 103, and an annotator user (e.g., such as a radiologist) may provide input using (for example) a mouse, track pad, stylus and/or keyboard that indicates (for example) whether the image depicts any tumor (or organ of one or more particular types); a number of tumors depicted in the image; a number of tumors that are being annotated (e.g., outlined) by the annotator; a perimeter of each of one or more tumors and/or organ of one or more particular types.

Annotator device 103 may translate the input into (for example) label data 104. Each label data set can be associated with a corresponding image data set. Label data 104 can indicate whether an image contains a tumor and/or one or more particular types of organs. Label data 104 can further indicate where the tumor(s) and/or organs are located within the image by identifying spatial features (e.g., a perimeter and/or an area) of the tumor(s) and/or organs. For example, label data 104 may include a set of coordinates that identify coordinates associated with a perimeter of each of a set of depicted tumors. As another example, label data 104 may include an indication as to which pixels (or voxels) in a training image correspond to a perimeter and/or area of the depicted tumor.

Spatial features may additionally be identified for multiple objects. In some instances, label data 104 may (but need not) identify spatial features of all tumors, organs, and/or other biological objects depicted within the training image. For example, if a training image depicts 10 tumors, label data 104 may identify a perimeter for each of the 10 tumors, or for just 2 of the depicted tumors. In such cases, the incomplete subset of objects may (but need not) be selected based on a predefined selection criteria. For example, an annotator user may have been instructed to only mark depictions of tumors that meet a threshold tumor length and/or a threshold tumor volume and/or within a region of interest (e.g., within one or more specific organs).

Label data 104 may further identify a tumor classification, which may represent a type, a location, and/or size of a tumor as identified based on input from an annotator. For example, a particular label may indicate that a depicted tumor is within a region of an image 102 as corresponding to a specific organ (e.g., a liver). Label data 104 may further include a probability that a particular label actually corresponds to a tumor or an organ of interest. Probability values can be calculated based on a tumor length, a tumor volume, a location with the subject, and/or a number of annotation users that identify the particular label as corresponding to a tumor or organ. Label data 104 can be used to train one or more neural networks to detect, for each image in the image scan, each region that includes a depiction of a tumor or organ. Trained neural networks may be configured to delineate each region identified as including the depicted tumor or organ by processing image scans with an individual focus (e.g., to define specific regions for each individual image) using image stacks corresponding to each of the respective scans.

A neural network processing system 120 can be configured to receive one or more sets of images 102 and corresponding label data 104. Each image of the one or more sets of images may initially be preprocessed by a preprocessing controller 105. For example, one or images depicting different regions of a subject may be stitched in order to generate an aggregated image depicting all of the different regions. In some instances, an aggregated image depicts a "whole body" view of a subject. As another example, one or more images may be scaled and/or cropped to a predefined size. In yet another example, one or more images may be aligned to another image included within the set or to a reference image (e.g., using an alignment marking in the image, a correlation-based technique, or an entropy-based technique). In another example, pixel intensities of one or more images may be adjusted via normalization or standardization methods. In some instances, the sets of images 102 do not undergo any preprocessing techniques.

The preprocessed image(s) may be availed to a bounding-box detection controller 106, which can control and/or perform all of the functions and operations of a bounding-box detection network, as described herein. The bounding-box detection network may be a convolutional neural network, a de-convolutional neural network, or a three-dimensional neural network, that is configured to identify a region (e.g., bounding box) within the set of images 102 that includes a depiction of a tumor. Regions identified by the bounding-box detection neural network may include one or more rectangular or hyperrectangular regions.

Bounding-box detection controller 106 can use the training images and corresponding annotations to train the bounding-box detection network to learn a set of detection parameters 107. Detection parameters 107 can include weights between nodes in a convolutional network. A penalty function may be set to introduce penalties when part of a detected bounding box fails to fully include a depiction of a tumor and/or when padding between a further horizontal and/or vertical point is less than a lower threshold and/or greater than an upper threshold. In some instances, a penalty function is configured to penalize for boundary boxes that are larger or smaller than a predefined zoom range. A penalty function may include a focal loss. Focal loss (as defined in Lin, T. Y., Goyal, P., Girshick, R., He, K., Dollar, P. "Focal loss for dense object detection." *ICCV* 2017, pp. 2980-2988 (2017), which is hereby incorporated by reference in its entirety for all purposes) may be used to deal with class imbalances as well as to 'refocus' the training of the detection task towards hard-to-predict cases resulting from tag perceptual variability in tumors.

Training may be conducted and/or the bounding-box detection network can be defined using one or more fixed hyperparameters. For example, hyperparameters can include a learning rate, number of nodes per layer, number of layers, etc.

The bounding-box detection network can detect one or more bounding boxes 108 corresponding to potential tumor depictions within each of the images 102. Detection of a boundary box may include using an image stack for each image in order to locate a bounding box. For example, if 100 images were collected during a particular imaging session (sequentially numbered in accordance with imaging depth), an image stack can be defined to include a sixth image, seventh image and eighth image when detecting boundary boxes within the seventh image. The image stack may include more than one adjacent images in one or more directions (e.g., so as to include the third through eleventh images when detecting boundary boxes within the seventh image).

Features of the image stack are used to provide contextual information when determining whether and/or where one or more regions include a tumor and/or organ(s). The features can include three-dimensional features that extend across images within an image stack. For example, if a feature (e.g., a learned feature) is present in a similar location(s) throughout an entire image stack (e.g., a combination of a top virtual slice, a bottom virtual slice, and a central virtual slice), the bounding-box detection network may determine that the image region corresponding to (e.g., that includes) the feature represents a bounding box for a tumor. As an alternate example, if a feature of a central slice of an image stack is not present in either a top slice or a bottom slice of the image stack, the bounding-box detection network may determine that the image region corresponding to the feature corresponds to background (i.e., any biological structure other than a tumor) of the image and does not indicate a bounding-box. In some instances, the bounding-box detection network may additionally assign a probability value to each detected bounding box. If the probability value for a bounding box does not exceed a threshold, the bounding box may be discarded as background.

The bounding-box detection network may further process each detected bounding box 108, such that the margins of the bounding box include at least an amount of padding (e.g., 10px, 15px, or another suitable amount) from each edge of the region corresponding to the tumor. In some instances, the amount padding is predefined (e.g., so as to generate an initial box that intersects with pixels furthest to the left, top, right and bottom of the detected object depiction and extend the box using a predefined padding or until an image boundary is encountered). In other instances, varying degrees of padding are added so as to maintain uniform bounding-box sizes.

Bounding-box data associated with each bounding box 108 may include a definition of each bounding box (e.g., as two or more corner coordinates, coordinates of one or more edges, etc.) and/or one or more identifiers of a corresponding image or image set (e.g., an identifier of an image, subject, imaging date, etc.).

It will be appreciated that a location of a boundary box in one image may relate to a location of a boundary box in another image. An image stack may be used to convey this dependence, though other processing may further or alternatively be used. For example, an input to the bounding-box detection neural network may include an identification of each of one or more boundary boxes detected from a previously processed image (corresponding to a same imaging session and same subject). As another example, boundary-box outputs may be post-processed to modify (e.g., translate, resize, delete or add) a boundary-box detection corresponding to one image based on boundary-box detections from one or more other adjacent images.

Figure 1B:
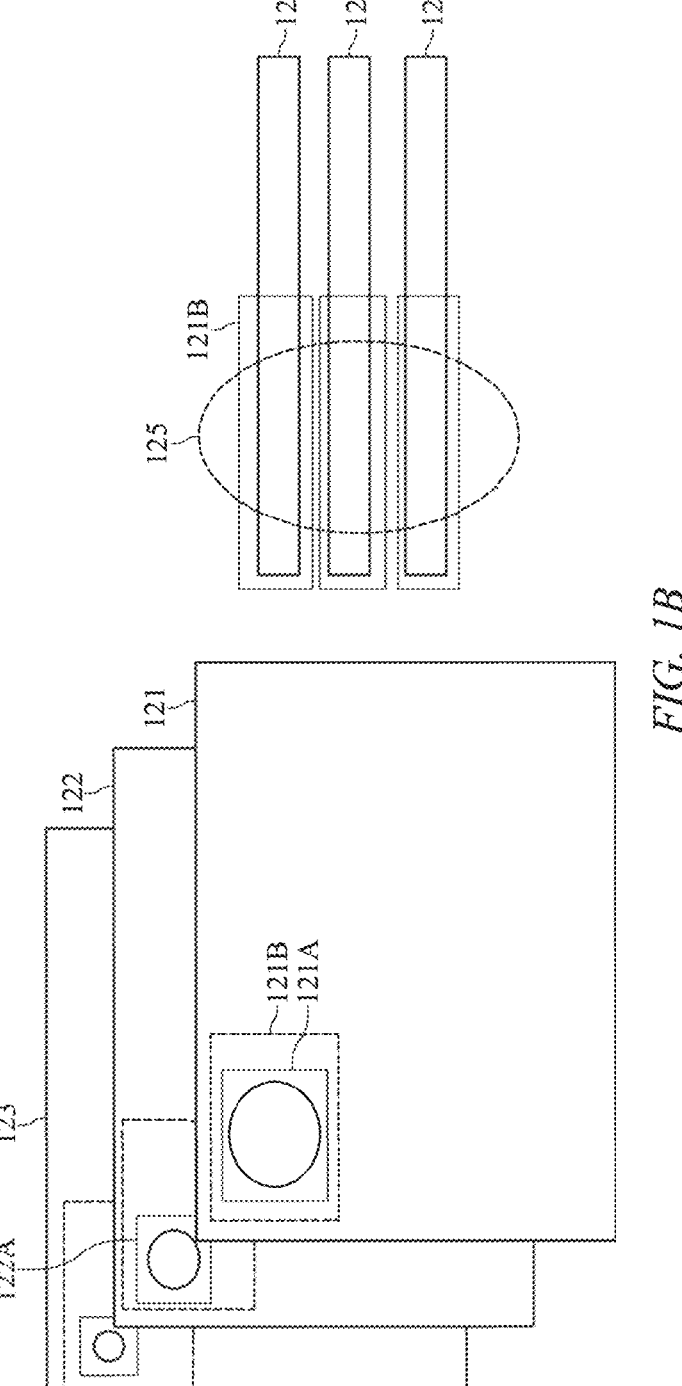
FIG. 1B illustrates an exemplary image stack which includes a set of patches and bounding boxes for a detected biological object.

FIG. 1B shows an exemplary image stack that depicts a set of bounding boxes for a single biological object 125. The image stack may include at least at least an image 121, an image 122, and an image 123 with each image of the image stack depicting a different axial perspective of a region of a subject. In some instances, the image stack may include additional images not shown in the figure. Each image within the image stack may further include a bounding box delineating a possible location of biological object 125 within the particular image, such that each bounding box may be related to the corresponding bounding box(es) included in the other images within the image stack, because each bounding box identifies a presence of the same biological object 125. For example, image 121 contains a bounding box 121A that covers at least a portion of image 121 and image 122 contains a bounding box 122A that covers at least a corresponding portion of image 122, such that bounding box 121A and bounding box 122A are related bounding boxes, and include regions that have been predicted to depict a first possible location and a second possible location of the biological object 125 from a first axial perspective and a second axial perspective, respectively. In other instances, biological object 125 may not be detected within at least a subset (e.g., one or more) of images within the image stack, and the subset of images within the image stack may therefore not include a related bounding box for biological object 125.

There may further be differences within an exact location (e.g., represented by a set of coordinates), a surface area, and/or a shape of related bounding boxes within an image stack. In this example, a surface area of bounding box 121A may be less than a surface area of bounding box 122A, because a greater portion of the biological object 125 is estimated to be located within image 122. Locations of each of the related bounding boxes may additionally include one or more variations (e.g., in an x-plane, a v-plane, or both) that account for corresponding locations of the same biological object 125 from one or more different axial perspectives of the images within the image stack.

In some instances, responsive to identifying a set of related bounding boxes for an image stack, a detection area is determined for each of the related bounding boxes. For example, an image 121 may include a detection area 121B which surrounds bounding box 121A. Detection areas may be a same size and within a same location for each image within the image stack. In some embodiments, a size and location of a detection area may be determined from a location of a bounding box within a central slice (e.g., in this case, image 122) of the image stack. Detection areas may be configured to include an entirety of each of the identified bounding box along with additional padding. In some instances, detection areas may be determined by another neural network separate from the bounding-box detection network.

Referring back to FIG. 1A, bounding-box data associated with the bounding boxes 108 may be transmitted to a tumor segmentation controller 109, which can control and/or perform all of the functions or operations of a tumor segmentation network, as described herein. The tumor segmentation network may be trained using a training data set of at least the predicted bounding box data determined during training of the bounding-box detection network. A set of segmentation parameters 115 (e.g., weights) may be learned during training. In the depicted instance, the tumor segmentation network can be (for example) a neural convolutional neural network or a three-dimensional neural network, that is configured to detect and segment depictions of tumors. In some instances, the tumor segmentation network does not include a neural network and may instead use (for example) a clustering technique (e.g., K-means technique), histogram-based technique, edge-detection technique, region-growing technique and/or graph-partitioning technique. The tumor segmentation network may be configured to segment a tumor within each of the detected bounding boxes 108.

For each medical image within the set of images 102, bounding boxes 108 include (for example) one or more portions of the image that correspond to a bounding box(es), or an entirety of the image along with an identification (e.g., vertices' coordinates and/or edge coordinates) of the boundary box associated with the respective image. In some embodiments, interim processing (not shown) can be performed to generate a cropped set of images (e.g., referred to herein as detection areas) corresponding only to the region (s) of the images 102 enclosed by a bounding box 108. In instances in which multiple bounding boxes are defined for a given image, the tumor segmentation network can receive, as input, each corresponding detection area and process the detection areas separately.

Detection areas may provide a focused view of a target tumor as depicted within FIG. 1B. In some instances, detection areas may be of a predefined size. In such instances, a detection area may include another set of regions adjacent to the region corresponding to a bounding box as additional padding in order to maintain a predefined size of the detection area. In other instances, if a bounding box is larger than the predefined size (e.g., 400 pixels or 200 pixels×200 pixels), a region corresponding to a bounding box is partitioned into more than one windows (e.g., of and/or no larger than the predefined size), such that each window corresponds to a separate detection area. In such instances, detection areas corresponding to a single bounding box may include overlapping portions of an image.

If a bounding box extends throughout an image stack (as shown in FIG. 1B), a separate detection area may be defined for each image within the image stack. In some embodiments, processing of the detection areas is performed by the bounding-box detection network prior to transmitting the bounding-box data associated with bounding boxes 108 to the tumor segmentation controller 109.

The tumor segmentation controller 109 implements the tumor segmentation network which is configured to further identify and assess features (e.g., variation in pixel intensities) for each detection area to identify a perimeter, set of edges and/or contours corresponding to the tumor. The features identified by the tumor segmentation network may have similarities to and/or may be different than features identified by the bounding-box detection network. Though both networks may be trained to identify regions of an image that correspond to a tumor, different features may be useful to detect a relatively small structure as compared to relatively large structure. In some instances, the tumor segmentation network may learn to detect a location of an object by (for example) analyzing pixel intensities, a pixel colors, and/or any other suitable image features. As an example, the tumor segmentation network may identify an edge of an object by analyzing an image to detect regions having high contrast, large intensity ranges and/or high intensity variations (e.g., as determined by comparing region-specific metrics to a predetermined threshold value). The tumor segmentation network may include nodes that correspond to different receptive fields (and thus that analyze representations of different collections of pixels). Thus, the network may learn to detect and use at least some different types of features.

In some instances, the tumor segmentation network may utilize the spatial context provided by other images within an image stack to identify the set of edges and/or contours corresponding to the tumor. The image stack can include (for example) three images, with a center image being the one in which tumors are to be detected.

The tumor segmentation network may further generate a 2-dimensional (e.g., binary) tumor mask 110 corresponding to an entire surface area of the tumor within a given detection area using the identified edges and/or contours. A tumor mask 110 may be defined to have values of zero across pixels that are not identified as depicting any part of the tumor. Pixels that are identified as depicting a part of the tumor may be assigned a value of one (e.g., for a binary mask) or another value.

In some instances, a binary tumor mask 110 is generated for each image in an image stack, such that each binary tumor mask 110 corresponds to a different axial perspective of the tumor. In such instances, a post-processing controller 111 can aggregate the set of binary tumor masks 110 to construct a 3D tumor mask 110 representing the tumor's 3-dimensional positioning and shape.

In some instances, the neural network processing system 120 can include an organ segmentation controller 111 configured to implement an organ-specific segmentation network. The organ-specific segmentation network can include (for example) a convolutional neural network and/or a three-dimensional neural network. Exemplary convolutional neural networks may include a VGG 16, a U-Net, and/or a ResNet18 network. The organ-specific segmentation network may be configured to analyze medical images corresponding to a subject and to segment one or more organs depicted within the images. In such instances, each of one or more organ-specific segmentation networks can be configured (e.g., via parameters learned during training) to segment a particular type of organ. Exemplary organs of interest may be (for example) a liver, or a lung, or a kidney, or a pancreas, etc.

In some instances, the organ-specific segmentation network may be configured to perform a series of convolutions, such as depthwise and pointwise-convolutions, as part of a segmentation process. In such instances, one or more inflations along a particular dimension may further be performed. The particular dimension may be a third dimension, a fourth dimension, etc. In some instances, the tumor segmentation network may also apply one or more filters, such as a replicate filter.

In the depicted instance, organ segmentation controller 111 can control an organ-specific segmentation network configured to detect a particular type of organ. The organ-specific segmentation network can be trained using a training data set that includes training images and annotations that indicate which portions, within each of at least some of the training images, depict the particular type of organ. The training data set may be separate from the training data set used by the bounding-box detection network and the tumor segmentation network. The training data set can include multiple medical images and corresponding annotations and/or segmentation boundaries (e.g., generated by an annotator device 103) for the particular organ of interest. A set of organ segmentation parameters 112 (e.g., weights) may be learned during training. In some instances, pre-processing controller 105 may transmit the same set of medical images 102 to both bounding-box detection controller 106 and organ segmentation controller 111.

The trained organ-specific segmentation network can be used to process each of a set of images and/or preprocessed images to detect organs. Images used for detecting the particular type of organ may be the same as (or different than) the set of images 102 provided to bounding-box detection controller 106, such that the images are provided to organ segmentation controller 111 concurrently. The set of images may be divided into multiple (e.g., overlapping) subsets that include 1, 2 or 3 images. For example, subsets may be defined to have three images per subset and a shift of one image per subset. In some instances, the images may undergo preprocessing in order to align the images into a 3D image depicting a "whole body" view of a subject.

Within each image, the organ-specific segmentation network can indicate whether a given image depicts a particular type of organ and further identifies a perimeter of a depiction of an organ. An output of the organ-specific segmentation network can include an organ mask 113 that (for example) has values of zero for pixels not depicting a particular type of organ and non-zero values for pixels depicting a particular type of organ. In some instances, multiple 2-dimensional organ masks corresponding to different virtual slices (e.g., perspectives) of the organ of interest may be generated. These 2-dimensional organ masks may be aggregated to generate, for each organ, a 3D organ mask.

Post-processing controller 114 can individually and/or collectively process tumor masks 110 and organ masks 113 to generate statistics and/or descriptors. For example, for each tumor, post-processing controller 114 can identify a volume of the tumor and can further identify whether the tumor is within any organ (and, if so, which type of organ). Post-processing controller 114 can further process (2- or 3-dimensional tumor masks) to calculate subject-level tumor statistics, such as a total tumor volume and/or density for a subject and/or a sum of longest dimensions. In some instances, a sum of longest dimensions may be a sum of longest diameters, such that a longest diameter is calculated for each tumor and summed to form the total sum of longest diameters. In some instances, post-processing controller 114 can identify a percentage of a mass of the tumor in comparison to a mass of the corresponding organ of interest as another exemplary statistic.

Neural network processing system 120 can output the descriptors and/or statistics to a user device. Further, a representation of one or more tumor masks and/or one or more organ masks may be transmitted. For example, an image may be generated that includes a depiction of an original image with overlays that identify a perimeter of each detected tumor and/or organ for a subject. In some instances, post-processing controller 114 may further process (e.g., or transmit to another model and/or controller for processing) the subject-level tumor statistics to generate a score(s) for a probability of survival using one or more treatment methods.

While the interaction system depicted in FIG. 1A relates to detecting tumors and determining whether various tumors are within different organs, alternative embodiments may relate to detecting other types of biological objects. For example, a first network may be trained to detect brain lesions and other networks can be trained to detect various brain regions, such that it can be determined in which brain region a lesion is located. As such, alternative embodiments may replace at least the tumor segmentation network with a different segmentation neural network trained to segment other biological structures within the medical images.

Recent image analysis efforts have focused on developing automated algorithms that can aid the radiologist's workflow by performing tumor detection and segmentation. Recent methods focus on detecting and/or segmenting RECIST lesions in a single axial CT (computed tomography) section as target lesions may be indicative of certain diseases, which may need to be measured over time. These recent efforts may be limited due to segmentation of tumors only on a single slice, or in a single organ (e.g., in the lung) for tumor screening, as opposed to advanced stage subjects that may suffer from a higher and more variable tumor burden.

CT-RECIST relies on whole-body CT scans in tumor detection/segmentation. However, patients sometimes may not get a whole-body coverage, i.e., chest, abdomen, and pelvis at a single scanning. Individual scans of chest, abdomen and pelvis may be acquired separately with a time interval from a few seconds to a few minutes. As such, before organ segmentation, the neural network processing system 120 may use a synthetic CT module to generate a whole-body CT scan covering chest, abdomen, and pelvis for each visit of a patient. Image series of different anatomies may be likely to have different contrast, resolution and some portions may be present at more than one series. For example, an abdomen scan may cover a part of lower chest region. These overlapping regions of different series should be consistent at the physical coordinate and the synthetic CT module may use this condition to concatenate the optimal series.

Figure 2:
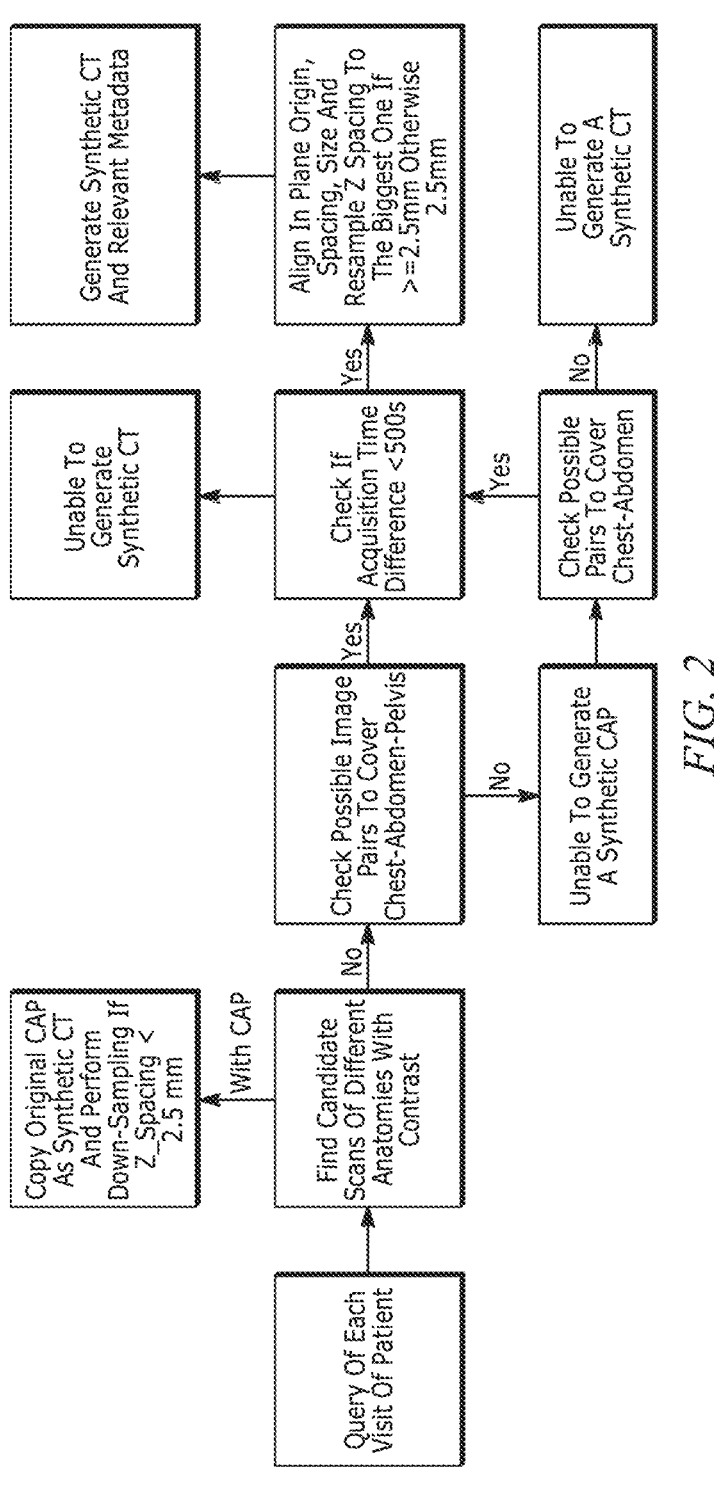
FIG. 2 illustrates an example flowchart describing the general process of synthetic CT generation.

FIG. 2 illustrates an example flowchart describing the general process of synthetic CT generation. At step 205, the synthetic CT module may query CT scans of each visit of a patient. At step 210, the synthetic CT module may find candidate scans of different anatomies with contrast. If there is an existing chest-abdomen-pelvis (i.e., with CAP) scan, the synthetic CT module may simply use it. At step 215, the synthetic CT module may copy the original chest-abdomen-pelvis (CAP) as synthetic CT and perform down-sample if z spacing is smaller than 2.5 mm. If there is no complete chest-abdomen-pelvis scan, the synthetic CT module may check possible image pairs to cover chest-abdomen-pelvis at step 220. To be more specific, the synthetic CT module may look for candidate pair of series, e.g., chest-abdomen and pelvis scans, chest and abdomen-pelvis scans, chest, abdomen, and pelvis scans. If there are no possible image pairs to cover chest-abdomen-pelvis, the synthetic CT module may determine it is unable to generate a synthetic chest-abdomen-pelvis (CAP) at step 225.

At step 230, the synthetic CT module may further check possible pairs to cover chest-abdomen. If there are still no possible pairs to cover chest-abdomen, the synthetic CT module may determine it is unable to generate a synthetic CT at step 235. If there are possible image pairs to cover chest-abdomen-pelvis or chest-abdomen, the synthetic CT module may check if acquisition time difference is smaller than 500 seconds at step 240. If the acquisition time difference is not smaller than 500 seconds, the synthetic CT module may determine it is unable to generate synthetic CT at step 245. Once an ideal pair of series are found (acquisition time interval is less than 500 seconds), the synthetic CT module may align them based on image origin, orientation, and resolution. To be more specific, the synthetic CT module may align in plan origin, spacing, and size. The synthetic CT module may additionally resample z spacing to the biggest one if it is larger than 2.5 mm otherwise 2.5 mm at step 250. Accordingly, cropping and resampling may need to achieve the same size and resolution. At step 255, the synthetic CT module may generate synthetic CT and relevant metadata. Such metadata may be generated to guide the subsequent analysis module in the pipeline. For example, the metadata may comprise one or more of slice location to concatenate multiple series, voxel size, or dimension. In particular embodiments, a quality-control (QC) module based on neural network may be also used to confirm that the generated synthetic CT has complete anatomical coverage.

Figure 3:
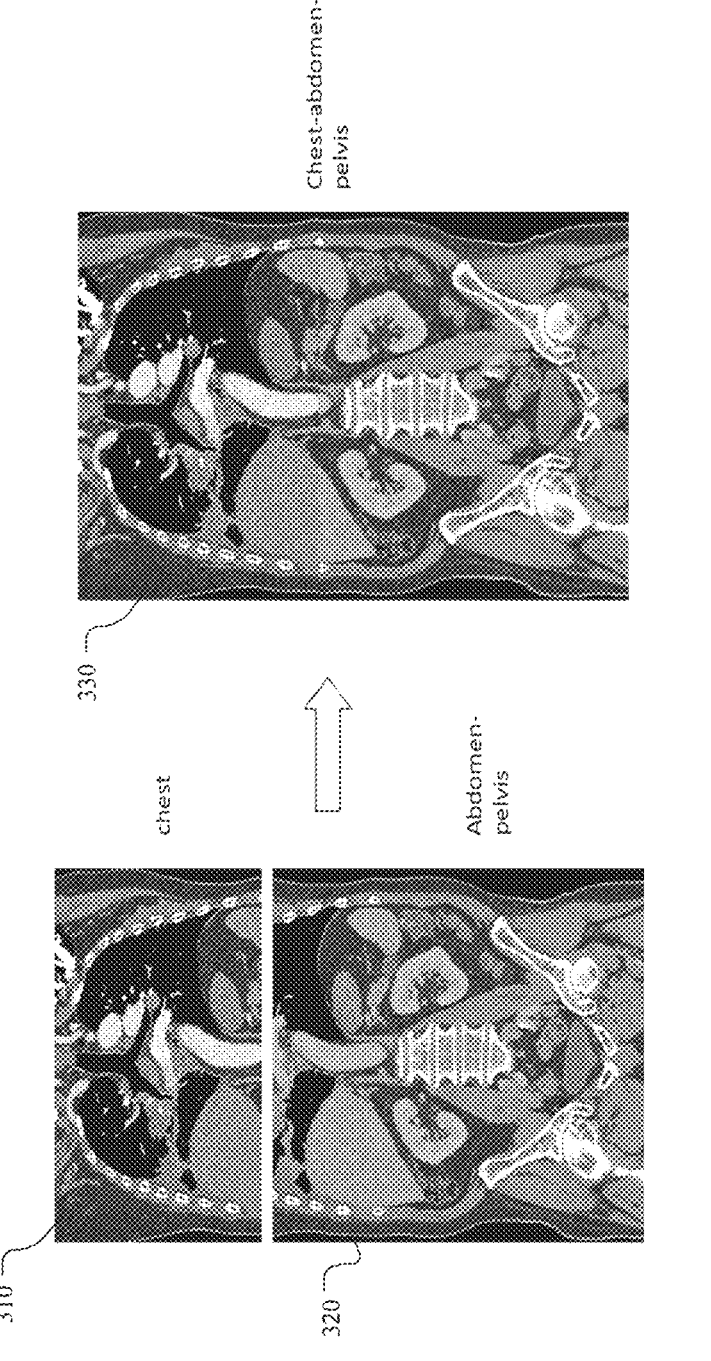
FIG. 3 illustrates an example synthetic CT which is generated by a pair of chest and abdomen-pelvis scans.

FIG. 3 illustrates an example synthetic CT which is generated by a pair of chest and abdomen-pelvis scans. In FIG. 3, subfigure 310 depicts a chest scan and subfigure 320 depicts an abdomen-pelvis scan. They have different resolution, contrast, and noisy level. Based on the chest scan and the abdomen-pelvis scan, the synthetic CT module may generate a synthetic CT 330 following the process described in FIG. 2. In particular embodiments, synthetic CT scans may be comprised in images 102 as described in FIG. 1A. Accordingly, the synthetic CT scans may be input to the preprocessing controller 105, after which segmentations may be performed by the neural network processing system 120.

Figures 4A, 4B:
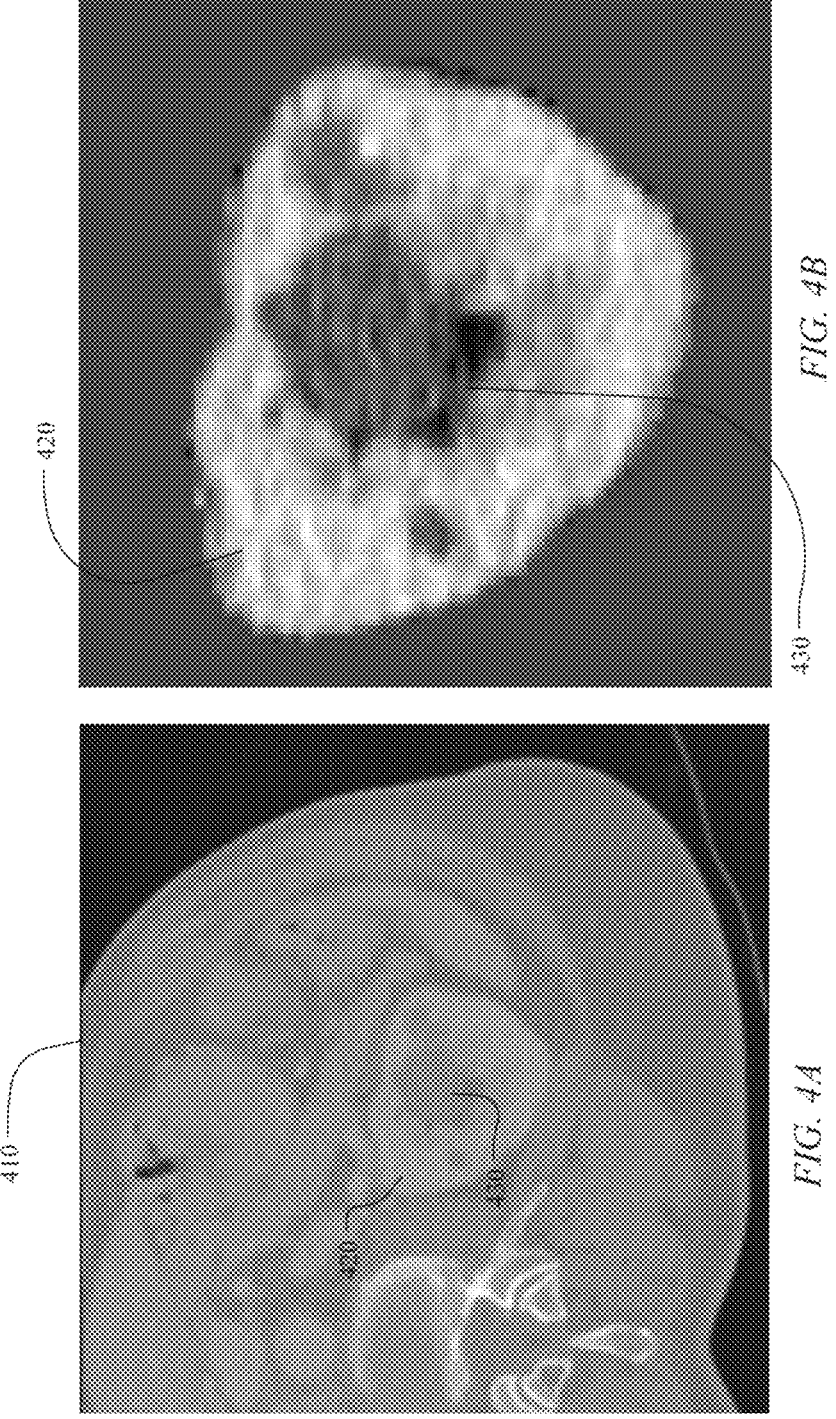
FIG. 4A illustrates an example CT scan image.
FIG. 4B illustrates an example segmentation of an organ of the CT scan image.
Figure 4C:
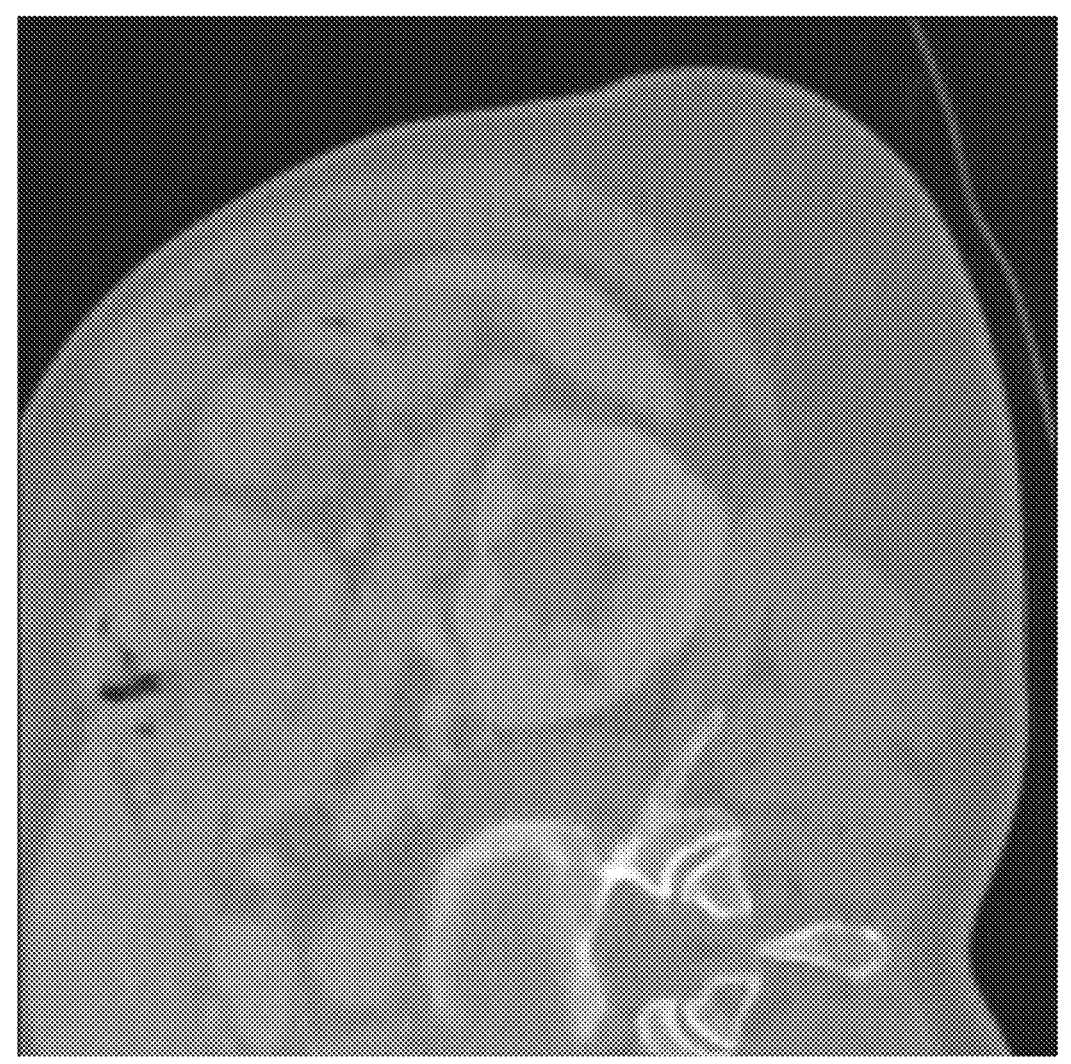
FIG. 4C illustrates an enlarged version of the example CT scan image of FIG. 4A.
Figure 4D:
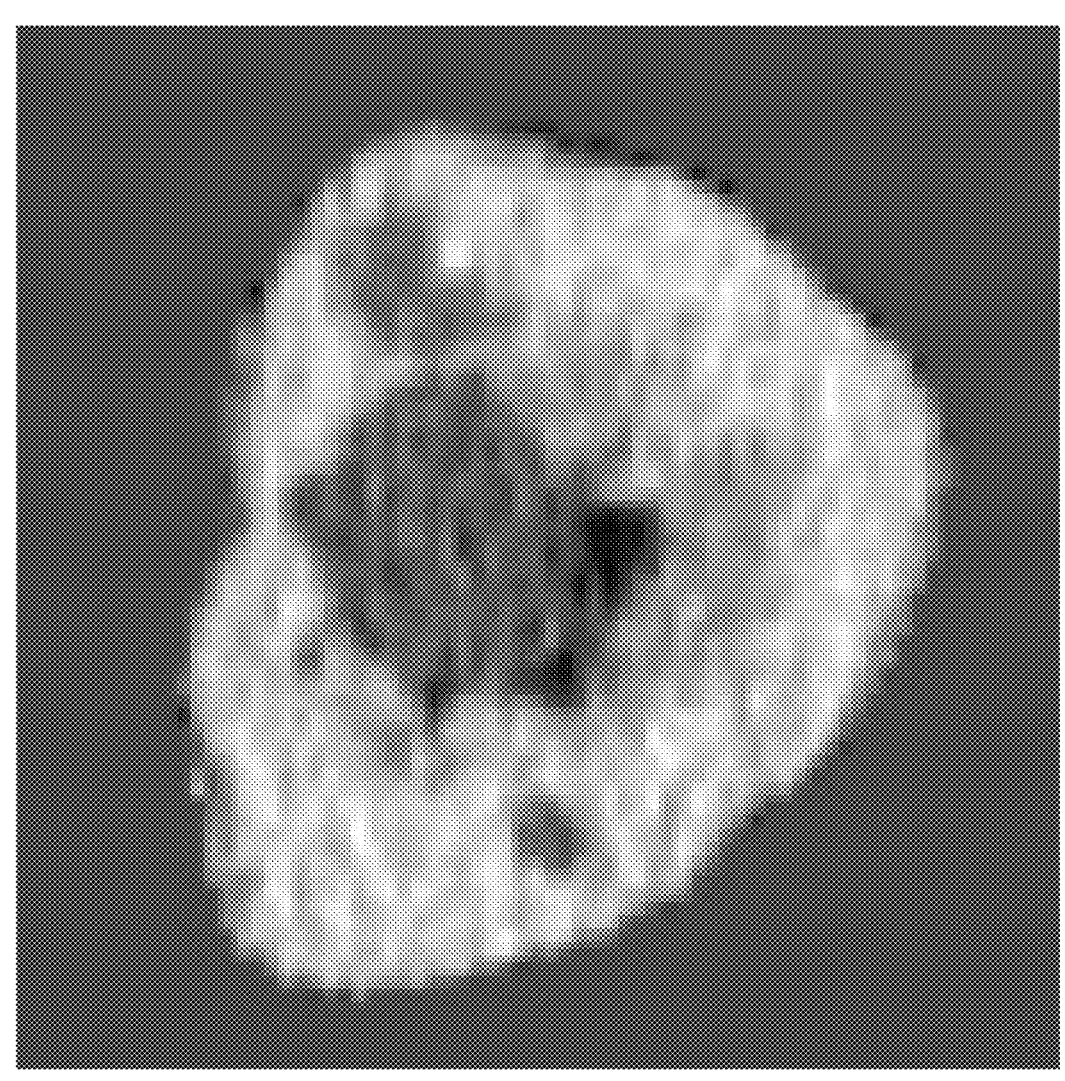
FIG. 4D illustrates an enlarged version of the example segmentation of an organ of the CT scan image of FIG. 4B.

CT-RECIST stipulates at most two target (measured) lesions per organ. Hence, there may be a need to learn organ masks to know the boundaries of the organ. There may be two types of lesions. One type of lesions is target lesions indicative of certain diseases. The other type of lesions is non targeted. Target lesions may be more important for diagnosis purposes and the difference among target lesions may have to be measured, e.g., by radiologists. One may hypothesize that machine-learning models, e.g., a neural network may be significantly more accurate in lesion segmentation if lesions appear as the only inhomogeneities in otherwise fairly homogeneous image texture. This may be achieved by masking out everything from the input image except for one organ as the inside of an organ may be more homogeneous than the CT scan image as a whole. FIGS. 4A-4D illustrate an example CT scan image and an example segmentation of an organ of the CT scan image. Specifically, FIG. 4C illustrates an enlarged version of the example CT scan image of FIG. 4A and FIG. 4D illustrates an enlarged version of the example segmentation of an organ of the CT scan image of FIG. 4B.

FIG. 4A illustrates an example CT scan image 410. The CT scan image 410 may comprise portions depicting different organs, e.g., organ 420. The organ 420 may comprise lesion 430. FIG. 4B illustrates an example segmentation of an organ of the CT scan image. FIG. 4C illustrates an enlarged version of the example CT scan image of FIG. 4A. In FIG. 4B, the organ 420 is segmented by masking out everything from the CT scan image 410. On the other hand, CT scan images may be three dimensional, comprising a large amount of collections of slices. There may be not enough memory to load and process such large-scale images at full resolution from the computational perspective. Therefore, one may pass a CT image through a neural network organ-by-organ, which not only allows to use full resolution images, but also to focus the neural network on the range of CT values specific for each organ. Considering the requirement by RECIST and the computational issue, the neural network processing system 120 may use an automated approach based on a segmentation model for effective organ segmentation. In particular embodiments, the neural network processing system 120 may search for inhomogeneous areas in homogeneous organ mass, segment organs using the segmentation model, transform segmented organs back to CT reference frame, and resolve organ intersections.

In particular embodiments, the neural network processing system 120 may access a first scan image from a set of computed tomography (CT) scan images. Each CT scan image may be at a first resolution. The neural network processing system 120 may then detect one or more portions of the first scan image that each portrays one or more of air or a part of a CT scanner associated with the set of CT scan images. The neural network processing system 120 may then remove the detected one or more portions from the first scan image. In particular embodiments, the neural network processing system 120 may generate a first downscaled image of the first scan image by resampling the first scan image to a second resolution. The second resolution may be lower than the first resolution. Down-sampling the scan image may result in a technical advantage of computational efficiency as a down-sampled scan image may occupy less memory and may be also faster to load and process than a scan image with full resolution and may such large-scale images at full resolution.

The neural network processing system 120 may determine, by one or more first machine-learning models based on the first downscaled image, one or more coarse segmentations corresponding to one or more organs portrayed in the first scan image, respectively. In particular embodiments, at least one of the first machine-learning models may be based on a neural network model, at least one of the first machine-learning models may be based on an ensemble model of two or more neural network models, and at least one of the first machine-learning models may be based on a distillation model of the ensemble model. The neural network processing system 120 may then determine, for each of the one or more coarse segmentations, a region of interest associated with the corresponding organ. The neural network processing system 120 may then extract one or more segments of the first scan image based on the one or more coarse segmentations and their respective region of interests. Each extracted segment may be at the first resolution. In particular embodiments, the neural network processing system 120 may determine, by one or more second machine-learning models based on the one or more extracted segments of the first scan image, one or more fine segmentations corresponding to the respective one or more organs portrayed in the extracted segments. At least one of the second machine-learning models may be based on a neural network model.

At least one of the second machine-learning models may be based on an ensemble model of two or more neural network models. At least one of the second machine-learning models may be based on a distillation model of the ensemble model. Using the first machine-learning models for coarse segmentations and the second machine-learning models for fine segmentations may results in one or more technical advantages. One technical advantage may include automating the segmentation process, which may be manual in most existing approaches. Another technical advantage may include aiding the radiologist's workflow by performing tumor/lesion detection and segmentation automation based on machine-learning models. Another technical advantage may include improved accuracy for segmentation as machine-learning models may be significantly more accurate in lesion segmentation if lesions appear as the only inhomogeneities in otherwise fairly homogeneous image texture.

In particular embodiments, the neural network processing system 120 may map the one or more fine segmentations to the first scan image as follows. The neural network processing system 120 may identify one or more organ intersections. Each of the one or more organ intersections may comprise a plurality of voxels. Each of the plurality of voxels may be associated with two or more labels indicating two or more organs, respectively. Each of the two or more labels may be associated with a respective probability score. The neural network processing system 120 may then resolve each of the one or more organ intersections by assigning, to each of the plurality of voxels within the organ intersection, a label indicating one of the two or more organs that is associated with the highest probability score. After the mapping, the neural network processing system 120 may further generate a segmented image of the first scan image based on the one or more fine segmentations and the mapping.

The segmented image may comprise one or more confirmed segmentations corresponding to the one or more organs. The automated segmentation of each organ may result one or more technical advantages. One technical advantage may include improved tracking of lesions over time as each automatically segmented organ may provide a focused view capturing lesion progression and the improved tracking of lesions may further assist in medical analysis of certain diseases. Another technical advantage may include reducing the amount of required non-linear distortion and speeding up computations in lesion registration, as the neural network processing system 120 may register lesions on the per-organ basis instead of the per-scan basis after the organs are segmented.

Figure 5:
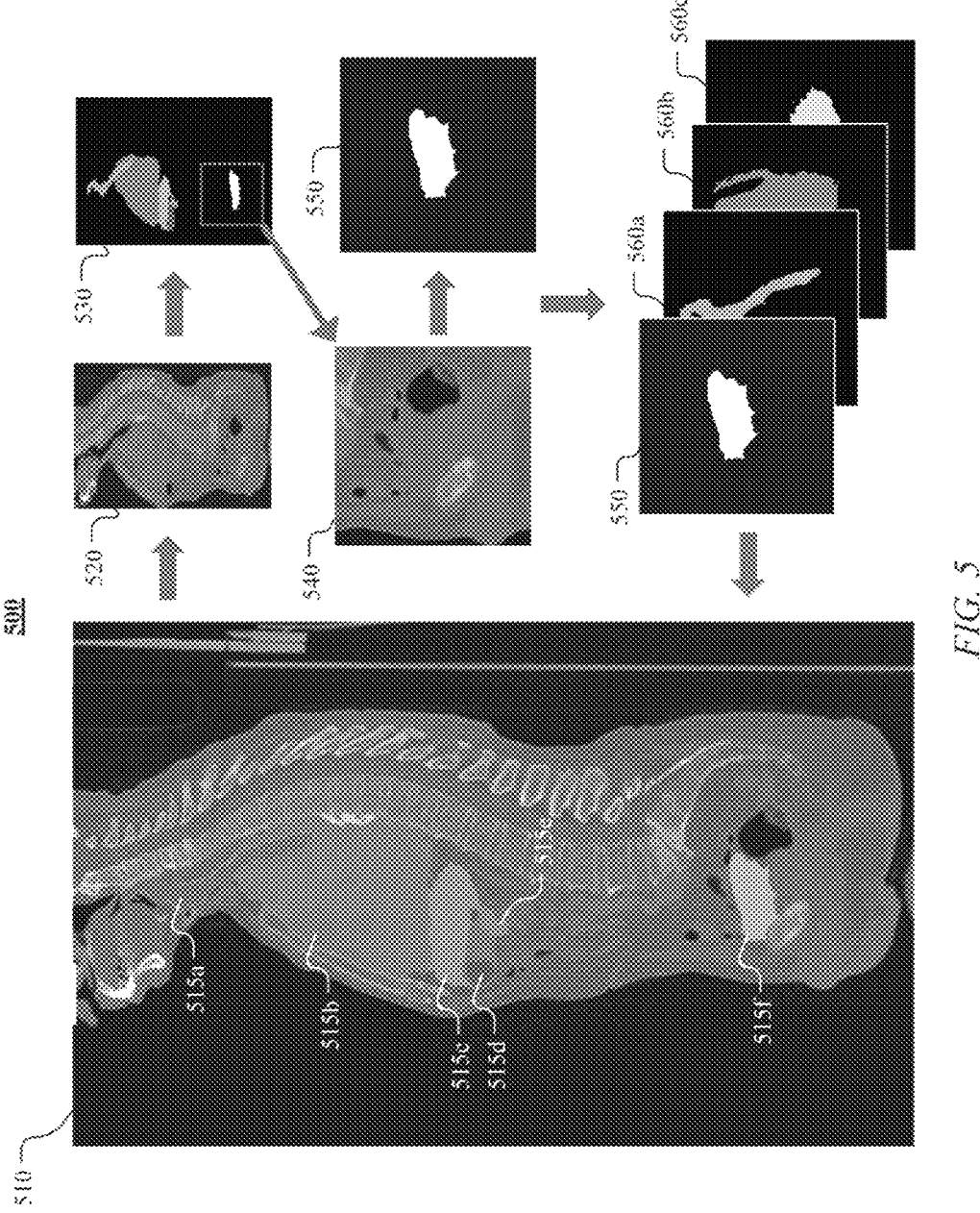
FIG. 5 illustrates an example process for organ segmentation.

FIG. 5 illustrates an example process 500 for organ segmentation. In FIG. 5, the original CT scan image 510 may depict a full torso with multiple organs, e.g., organ 515a, organ 515b, organ 515c, organ 515d, organ 515e, and organ 515f. The original CT scan image 510 may be a raw whole-body CT scan. Alternatively, the original CT scan image 510 may be a synthetic CT scan generated by the synthetic CT module. The CT scan image 510 may comprise portions corresponding to air and parts of the CT scanner. In particular embodiments, the neural network processing system 120 may remove the image portions irrelevant to the segmentation task first. The neural network processing system 120 may then downscale the CT scan image 510 by resampling a full torso CT scan image 510 to coarse resolution to generate a downscaled CT scan image 520. As an example and not by way of limitation, the coarse resolution may be 144 (front to back)×256 (left to right)×192 (up to down). In particular embodiments, the neural network processing system 120 may load the downscaled full torso CT scan image 520 to a neural network, which may determine locations of the organs in the downscaled CT scan image 520. The neural network processing system 120 may additionally set a threshold for each organ's segmentation to define a sharp segmentation boundary, which is then used to define the organ's ROI. The neural network processing system 120 may then run separate models each trained to segment an organ based on their respective ROIs in the original full-torso CT scan. The segmentation may leave the largest volume component for each organ. As an example and not by way of limitation, in FIG. 5, the coarsely segmented organs may be depicted in image 530. In particular embodiments, the neural network processing system 120 may use the coarse organ segmentations to define ROIs centered on a given organ.

In particular embodiments, the neural network processing system 120 may resample the corresponding CT scan image fragments (coarse organ segmentations). As an example and not by way of limitation, the fragments may be resampled to 192×192×192. FIG. 5 shows that the CT scan image fragment 540 corresponding to organ 515f is resampled to the original resolution. The neural network processing system 120 may then perform fine segmentation for each coarsely segmented organ based on its corresponding full resolution CT image. More specifically, the neural network processing system 120 may focus on each coarsely segmented organ and segment the organ with full resolution to precisely identify boundaries. In particular embodiments, the neural network processing system 120 may run refinement models trained to segment specific organs in the ROIs, which may leave the largest volume component.

As an example and not by way of limitation, FIG. 5 shows the fine segmentation 550 of organ 515f generated from the resampled image fragment 540. In particular embodiments, the neural network processing system 120 may transform fine segmentation results (e.g., fine segmentation 550 and fine segmentations 560a-c) back to the original CT reference frame at full resolution. The organ segmentations may sometimes intersect with each other or sometimes compete with each other. Therefore, the neural network processing system 120 may consolidate these segmentations by resolving organ intersections by keeping the labels of the voxels with the highest probability score.

In particular embodiments, the neural network processing system 120 may apply image preprocessing before performing the segmentations for the following issues. One issue may be that very grainy CT images may result in bad segmentations. To mediate such issue, the neural network processing system 120 may smooth all CT scan images before segmentation. Another issue may be that an organ may have a discontinuity in contrast when stitching two images at their boundary. For example, a full CT scan is sometimes done in parts with several scans on the same day after contrast agent was injected to a patient. There is usually a time interval of several minutes between these scans. Because of the acquisition time difference, the injected contrast agent uptake may vary for concatenated scans, which may result in contrast steps in some organs across the stitching boundaries.

In particular embodiments, the neural network processing system 120 may determine a contrast mismatch between the first scan and the second scan for a given organ on different sides of the juxtaposition line. To mediate this issue, the neural network processing system 120 may equalize the contrast mismatch based on CT values for the two scans. In particular embodiments, the equalization of the contrast mismatch may be completed by applying the two-pass segmentation per organ. Specifically, in the first pass, an approximate organ segmentation may be used to calculate the contrast step across the organ. In the second pass, the contrast may be equalized by scaling CT values in one part of the image and then the organ segmentation may be repeated. In particular embodiments, the neural network processing system 120 may calculate average intensity of an organ on either side of a juxtaposition line and equalize intensities by using a multiplier. As an example and not by way of limitation, the neural network processing system may multiply the less visible portion by 1.2. In alternative embodiments, the neural network processing system may train on images with synthetic CT scans having juxtapositions instead of whole torsos to solve such issue.

Figure 6:
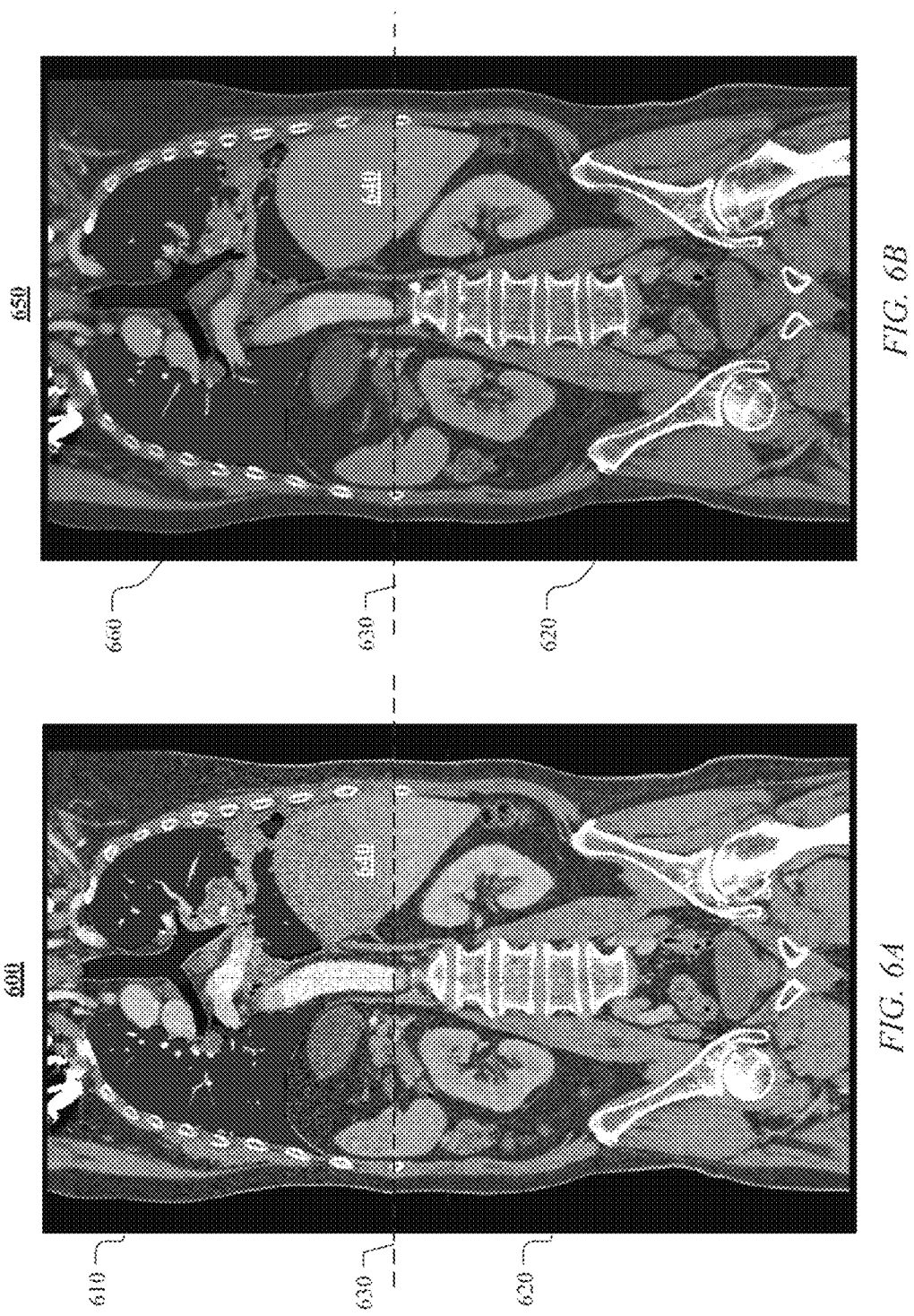
FIG. 6A illustrates an example CT scan image.
FIG. 6B illustrates an example segmentation of an organ of the CT scan image.

FIGS. 6A-6B illustrate an example juxtaposition of two scans dissecting an organ and the corresponding mediation. FIG. 6A illustrates an example contrast step in an organ when stitching two CT scan images together. The top CT scan image 610 and the bottom CT scan image 620 may be stitched together. For illustration purpose, a dashed line 630 is added to indicate that the whole CT scan image 600 is generated by stitching two CT scan images together. As can be seen, organ 640 may have the juxtaposition issue since the contrast agent was injected closer in time to the CT scan image 610 than to the CT scan image 620. FIG. 6B illustrates an example mediation of the scans juxtaposition. By applying the two-pass segmentation, the neural network processing system 120 may equalize the contrast mismatch to generate the whole stitched CT scan image 650. As an example and not by way of limitation, the top CT scan image 660 may be generated by multiplying the corresponding scan values with a multiplier. For example, organ 640 may look more homogenous above and below the dashed line 630.

In particular embodiments, the neural network processing system 120 may perform particular processing for particular organs. As an example and not by way of limitation, because head bones were not segmented in the training dataset, head may need to be removed before bone segmentation. This may be done by cutting the torso a few centimeters (e.g., 5 cm) above the top of the lungs, once they were segmented. Similarly, legs below pelvis may be removed prior to segmentation by finding the pelvis bottom.

Figure 7:
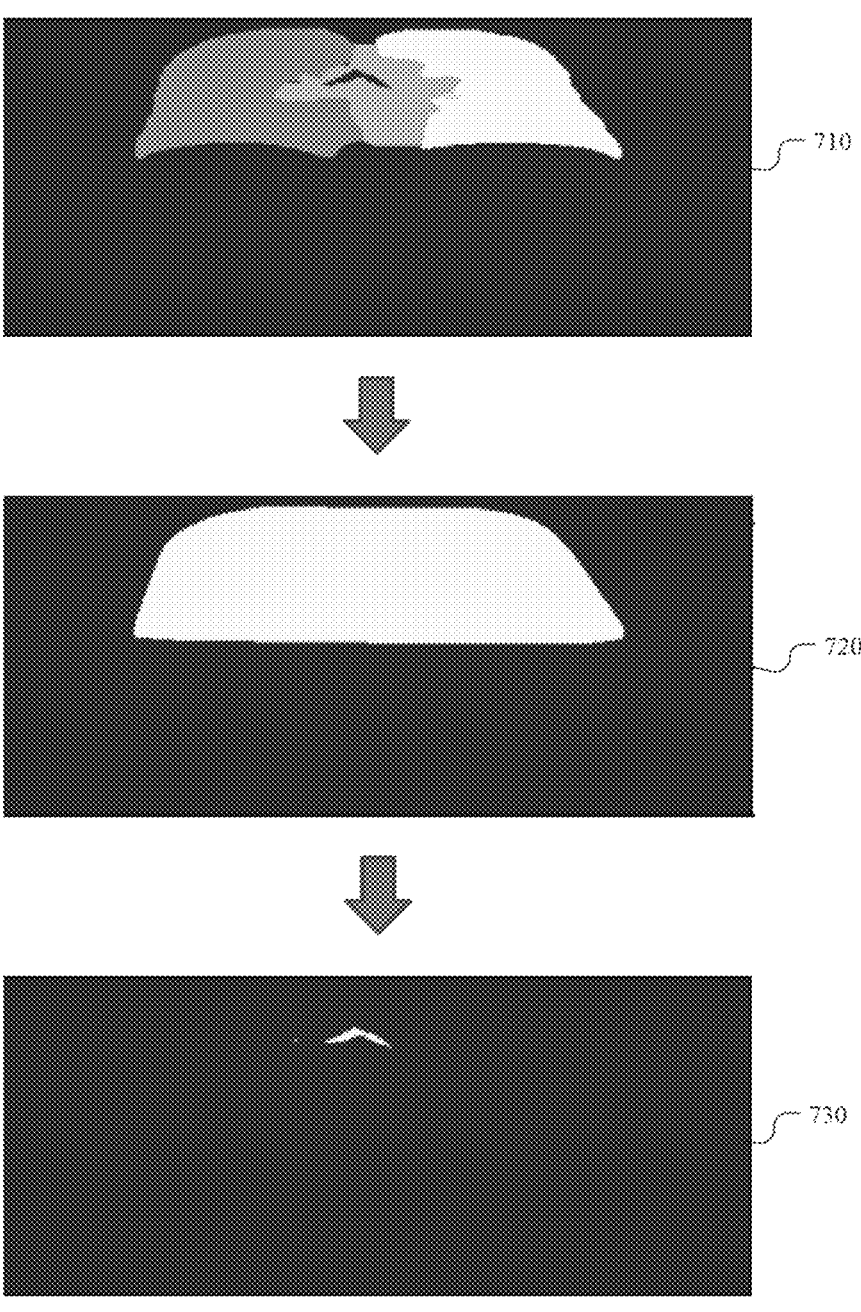
FIG. 7 illustrates an example segmentation process of bronchial tubes.

After certain organs are segmented, the neural network processing system 120 may use computer vision techniques to construct their convex hull with standard algorithms and identify areas of interest inside it based on image contrast. As an example and not by way of limitation, bronchial tubes may be segmented by finding air volumes within the convex hull of mediastinum and lungs and keeping the largest such volume. In this way the neural network processing system 120 may perform organ segmentations using the finest resolution. FIG. 7 illustrates an example segmentation process of bronchial tubes. The top image 710 of FIG. 7 shows that a few organs are segmented. The middle image 720 shows the identified convex hull. The bottom image 730 shows the identified bronchial tubes. In a similar manner for mesentery, once intestines and other abdominal organs are segmented, the neural network processing system 120 may take the convex hull of the intestines and identify mesentery as volumes with high-enough (above fat) intensities except intestines themselves or any other segmented organ inside the hull.

Figure 8:
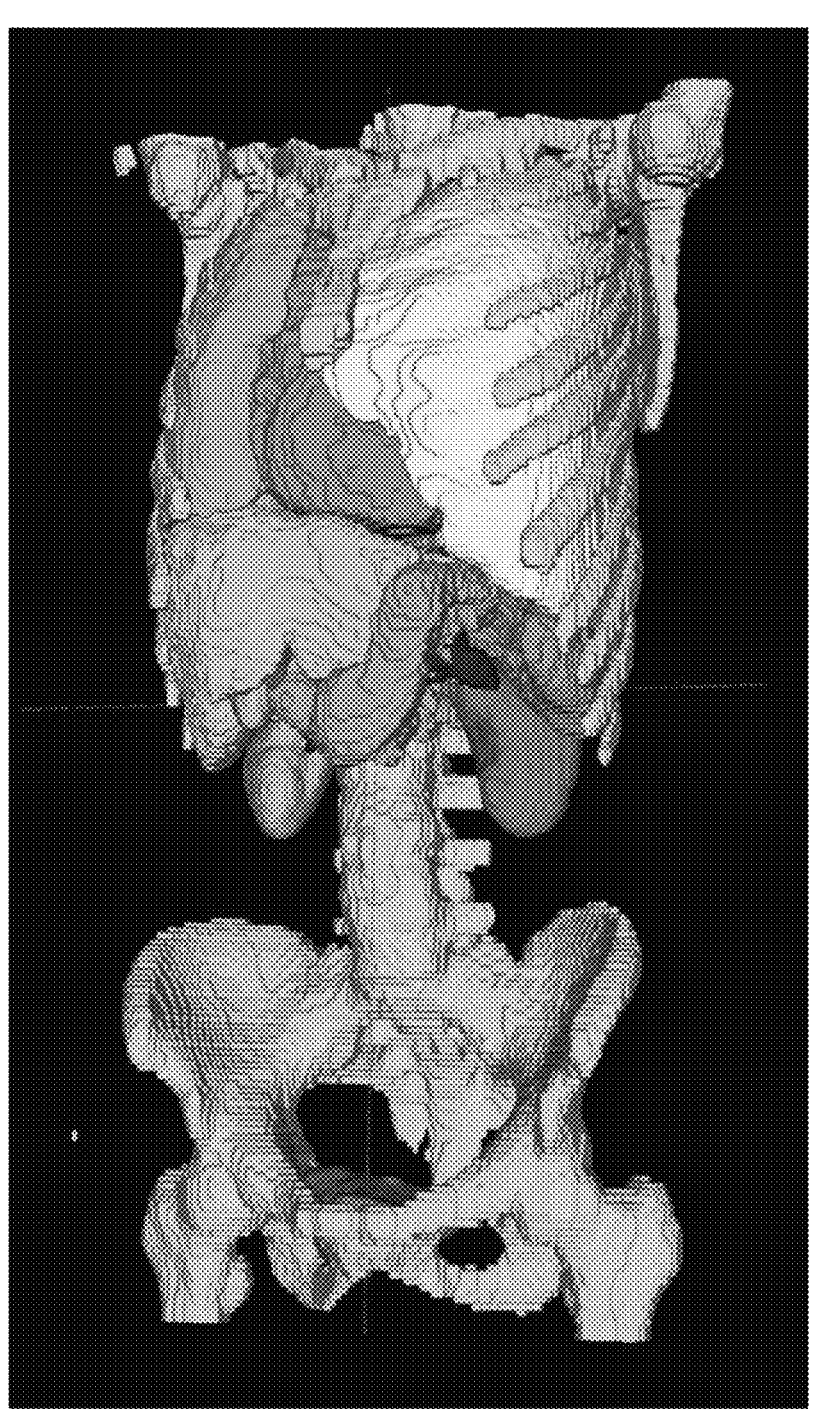
FIG. 8 illustrates an example 3D segmentation result.

FIG. 8 illustrates an example 3D segmentation result. Difficult organs like pancreas, gallbladder, etc. may be erroneously segmented into multiple disconnected components. For such difficult organs, the neural network processing system 120 may perform an additional clean-up step to remove all but the largest volume component. In particular embodiments, the segmentation model may be applied to a variety of organs or interest, where metastatic cancer activity is likely to occur, including sexual organs (e.g., mammaries, ovaries, uterus, and prostate), or intestines, mesentery, and large blood vessels, where a lot of adjacent lymph nodes may develop cancer lesions.

Figure 9:
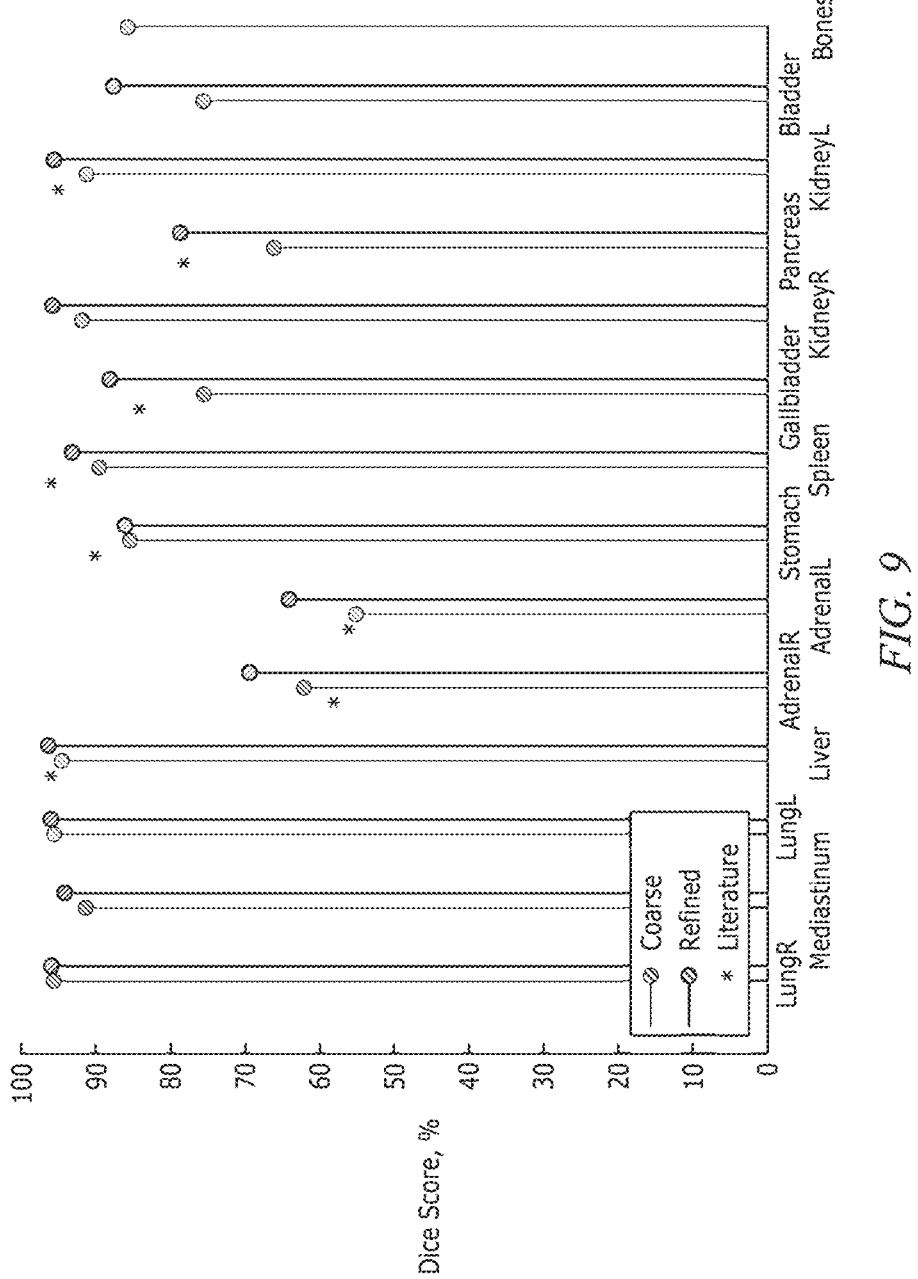
FIG. 9 illustrates an example comparison between coarse segmentation only, fine segmentation on top of coarse segmentation, and the literature.

FIG. 9 illustrates an example comparison between coarse segmentation only, fine segmentation on top of coarse segmentation, and the literature. The evaluation metric used is Dice score (the % overlap of the found segmentation with the true segmentation), which is the higher the better. As can be seen from FIG. 9, overall, the performance of fine segmentation on top of coarse segmentation is on-par with the best results in the literature.

Figure 10:
FIG. 10 illustrates example segmentations of intestines, mesentery, and aorta.

FIG. 10 illustrates example segmentations of intestines, mesentery, and aorta. As may be seen, large and small intestines, mesentery, and aorta may be segmented. Aorta is important because in the abdomen it is lined with multiple lymph nodes. Mesentery (a thin membrane connected to the intestines) contains a lot of abdominal lymph nodes too, but it is very difficult to segment directly. Instead, the neural network processing system 120 may segment mesentery in the same way as the bronchial tubes. In particular embodiments, the neural network processing system 120 may first calculate a convex hull over the segmented intestines. The neural network processing system 120 may then exclude intestines and all other previously segmented organs from the hull volume. The neural network processing system 120 may further threshold the remaining volume to the range of CT values characteristic for the mesentery, excluding visceral fat and blood vessels.

If the same neural network model is trained multiple times starting from random weights each time, the resulting models may not produce the same results. This indicates that the found solutions may not be global optima but rather various local optima. Each model may learn a set of features but randomly miss some features. As a result, during training, the confidence scores associated with segmentations may reach near 100% due to over-fitting (e.g., noise fitting). However, during testing, the confidence scores for each model may be much lower due to the missing features. An ensemble of multiple neural network models may learn more features due to its models ending in different local minima. Therefore, one may expect that combing these multiple solutions may capture more features than each individual model can provide. In particular embodiments, the neural network processing system 120 may use deep neural-network ensembles (i.e., referred as an ensemble model of neural networks) for organ segmentation, particularly for smaller or less regularly shaped organs.

Figure 11:
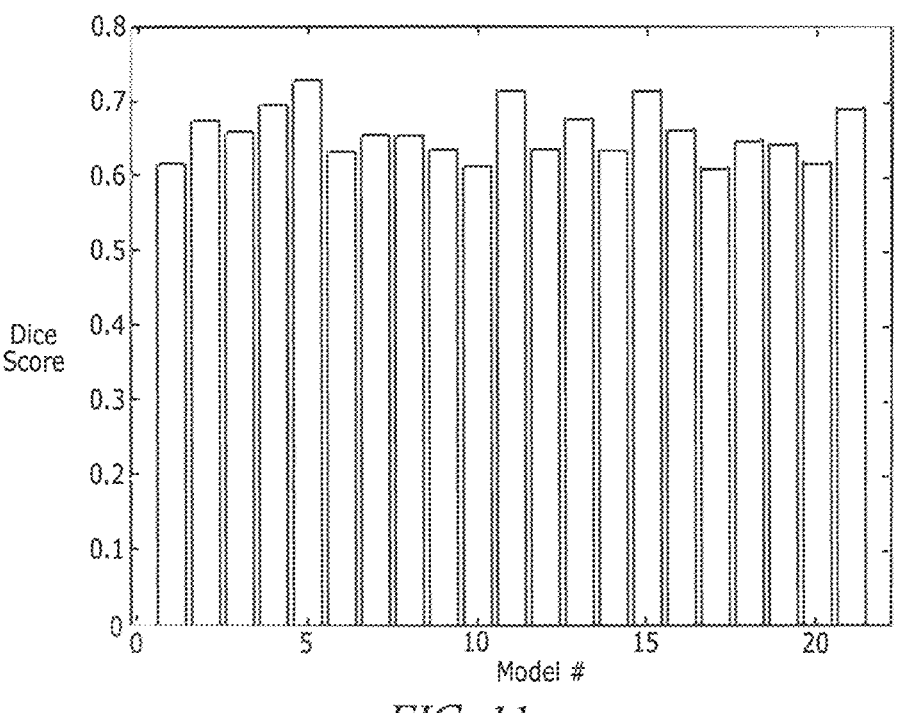
FIG. 11 illustrates based on deep neural-network ensembles with varying sizes.

As an example and not by way of limitation, such organs may comprise pancreas which are very small or intestines which are very convoluted. The neural network processing system 120 may train multiple neural networks based on the same training set with each being based on different starting weights. In particular embodiments, deep neural-network ensembles may simply average predictions of individual models. FIG. 11 illustrates example segmentation results based on deep neural-network ensembles with varying sizes. The results in FIG. 11 are based sizes of 1 through 21, indicating 1 to 21 neural network-based segmentation models are ensembled, respective. As can be seen, the performance generally is better when 5, 11, or 15 neural network based segmentation models are ensembled. This result may be data-dependent.

Figures 12A, 12B:
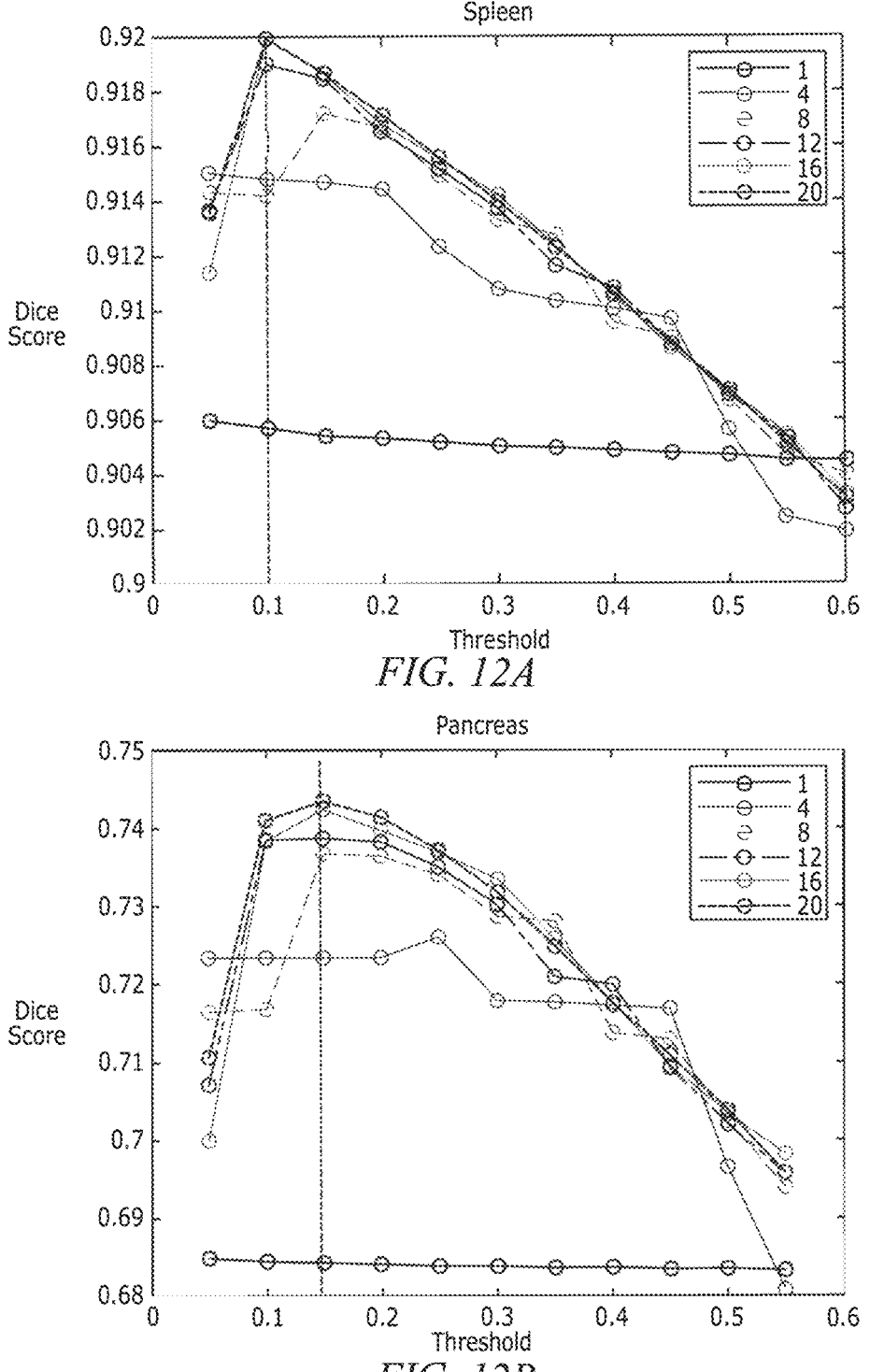
FIG. 12A illustrates example effects of the ensemble size and P threshold on spleen segmentation.
FIG. 12B illustrates example effects of the ensemble size and P threshold on pancreas segmentation.
Figure 12C:
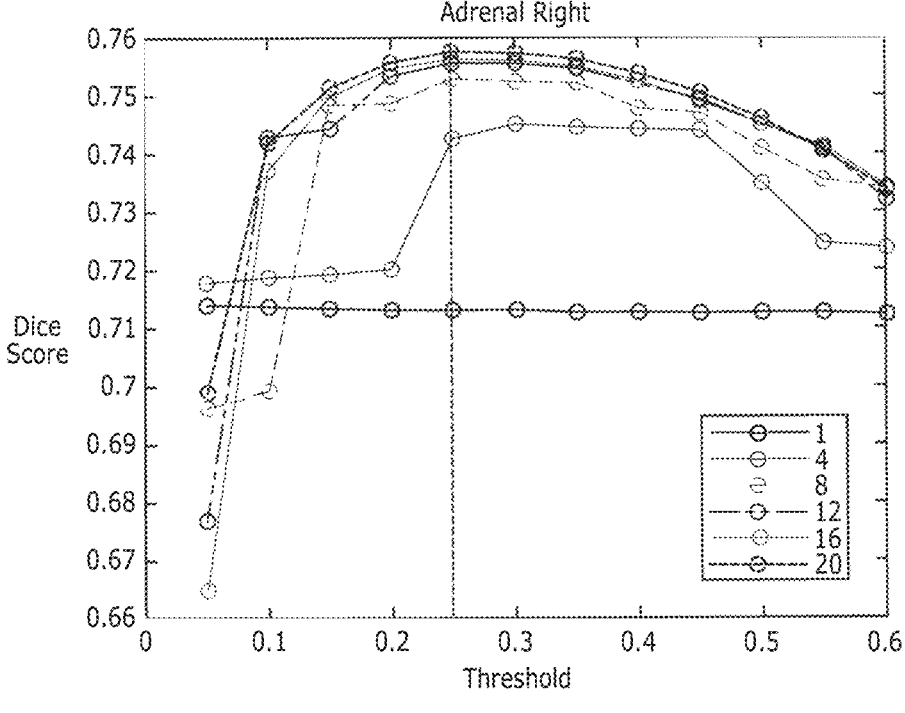
FIG. 12C illustrates example effects of the ensemble size and P threshold on right adrenal segmentation.

FIGS. 12A-12C illustrates example effects of the ensemble size and P threshold on spleen segmentation, pancreas segmentation, and right adrenal segmentation. FIG. 12A illustrates example effects of the ensemble size and P threshold on spleen segmentation. FIG. 12B illustrates example effects of the ensemble size and P threshold on pancreas segmentation. FIG. 12C illustrates example effects of the ensemble size and P threshold on right adrenal segmentation. In particular embodiments, the neural network processing system 120 tested ensembles of size 1, 4, 8, 12, 16 and 20, indicating 1, 4, 8, 12, 16, and 20 neural network-based segmentation models are ensembled, respectively. As may be seen from FIGS. 12A-12C, performance gain was most pronounced for 4-10 model ensembles. On the other hand, optimal probability threshold for a binary organ mask was 0.1 for spleen, 0.15 for the pancreas, and 0.25 for the adrenal glands. In particular embodiments, deep neural-network ensembles may be more advantageous when applied to lower-performing models.

Figure 13B:
FIG. 13B illustrates an example ensemble output.
Figure 13A:
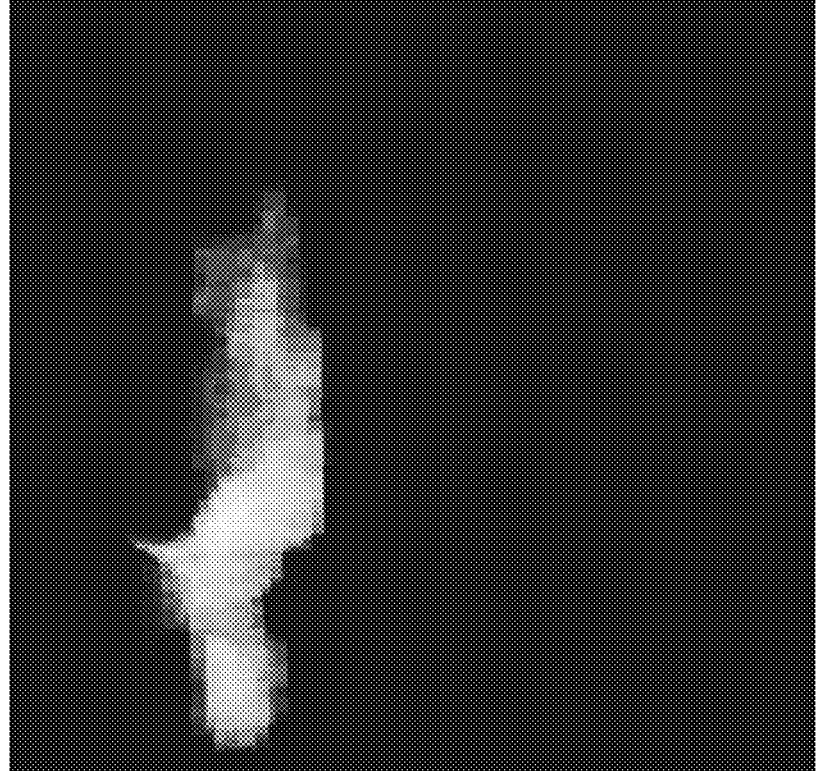
FIG. 13A illustrates an example ground-truth label of an organ.
Figure 13C:
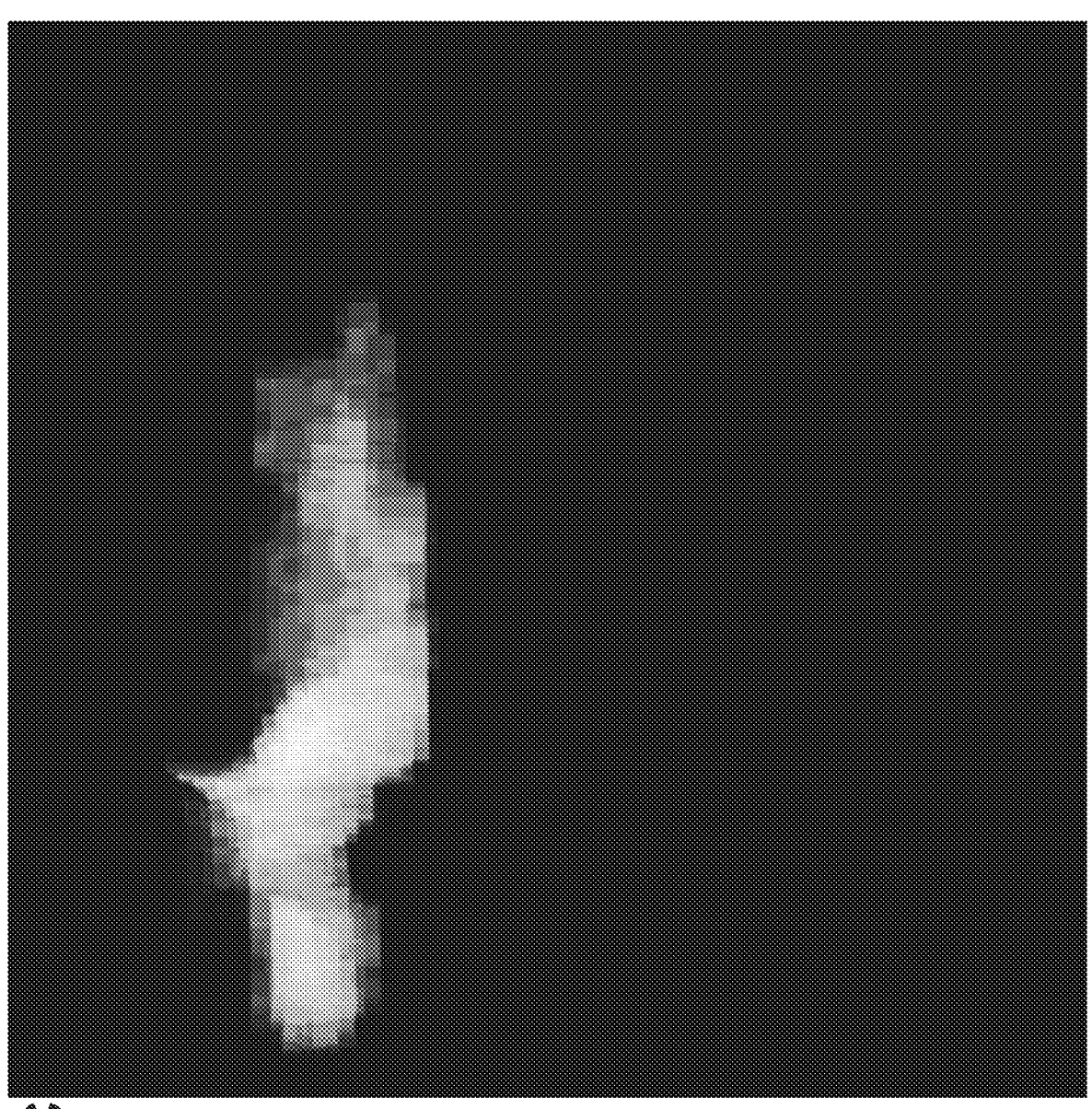
FIG. 13C illustrates an enlarged version of the example ground-truth label of an organ of FIG. 13A.
Figure 13D:
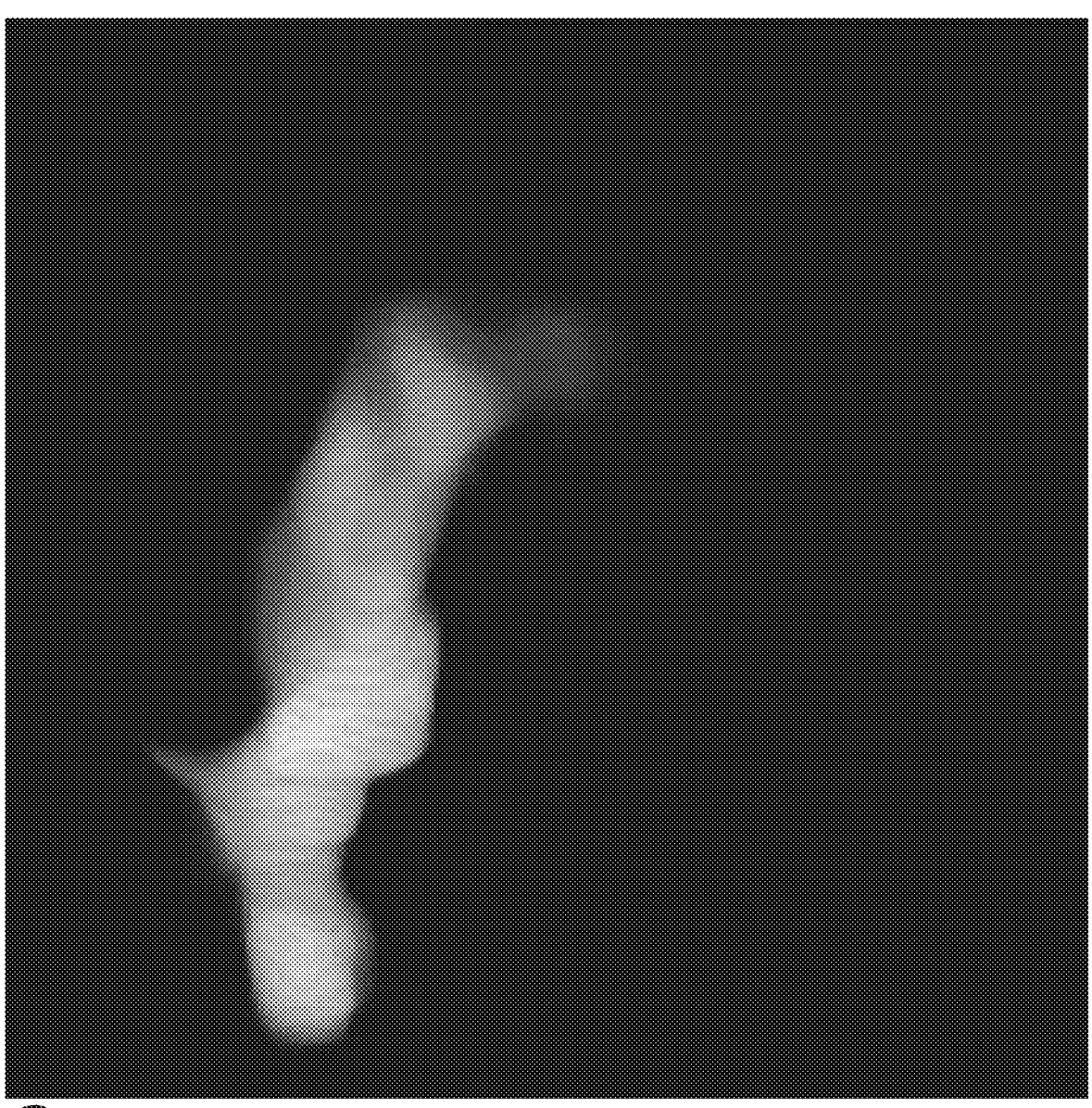
FIG. 13D illustrates an enlarged version of the example ensemble output of FIG. 13B.

In particular embodiments, the neural network processing system 120 may use a distillation model of the deep neural-network ensembles for segmentation. The distillation model may enable the system to capture the ensemble's increased performance in a single model. In particular embodiments, the neural network processing system 120 may generate the distillation model by training the model not on the actual ground-truth labels, but on the outputs of the ensemble (i.e., soft labels). FIGS. 13A-13D illustrate an example comparison between a ground-truth label and an ensemble output. Specifically, FIG. 13C illustrates an enlarged version of the example ground-truth label of an organ of FIG. 13A and FIG. 13D illustrates an enlarged version of the example ensemble output of FIG. 13B. FIG. 13A illustrates an example ground-truth label of an organ. In particular embodiments, each of the neural network model and the ensemble model may be trained based on ground-truth segmentation labels associated with the one or more organs. FIG. 13B illustrates an example ensemble output. In particular embodiments, the distillation model may be trained based on output from the ensemble model. As may be seen, the ensemble output (soft label) may be more comprehensive than the ground-truth label (hard label). As a result, ensemble distillation may further improve the performance due to soft labels, which may incorporate all the ensemble features.

Figure 14:
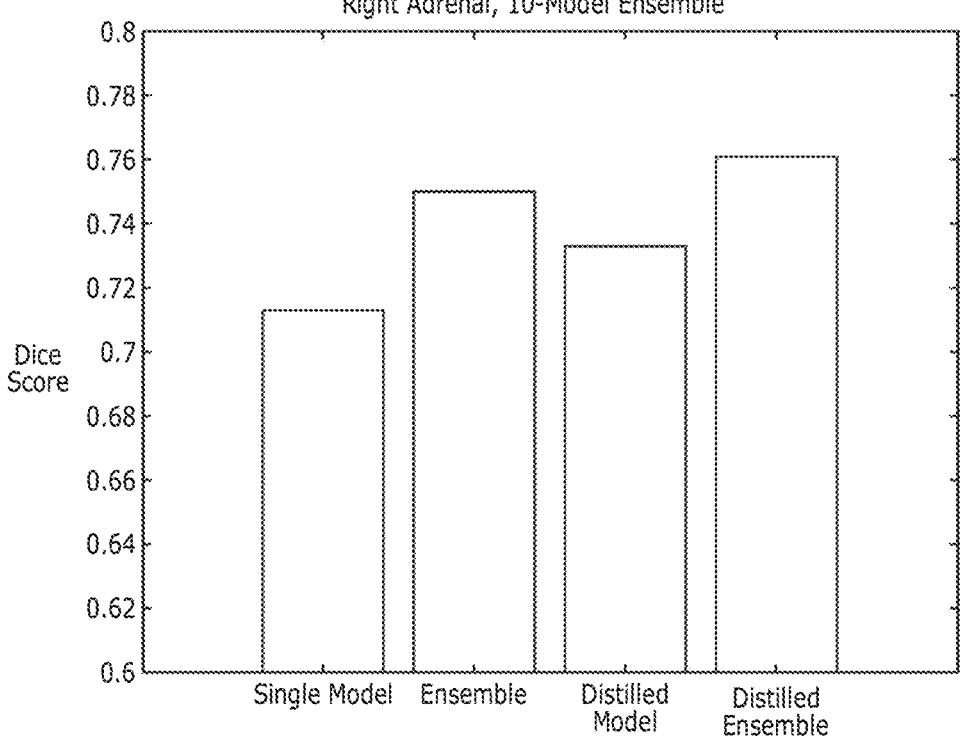
FIG. 14 illustrates example segmentation performance of distillation models.

FIG. 14 illustrates example segmentation performance of distillation models. The results are based on segmentation of right adrenal and evaluated by Dice score. For ensemble of neural network-based segmentation models, there are 10 models being ensembled. As may be seen, the distillation model performs better than a single model, but is worse than the whole ensemble. As an example and not by way of limitation, the distillation model may obtain improved segmentation accuracy by up to 5% more so for organs with lower accuracy. Besides performance gain, the distillation model may also provide some information about the uncertainty of the segmentation and allow one to easily incorporate various versions of the ground-truth into the solution. However, if ensemble is applied to the distillation model, we may see further improvement. As can be seen in FIG. 14, the distillation ensemble model is advantageous over all the other three models.

In particular embodiments, during the training of the segmentation model, the deep neural-network ensemble model, and the distillation model, the neural network processing system 120 may use different techniques for instantiating the starting random weights for the neural networks. In addition, the neural network processing system may use different subsets of the training images to train different models and select the top performing models to use for organ segmentation.

In particular embodiments, the neural network processing system 120 may use the segmentations to aid lesion registration, which matches tumors growing over time. In particular embodiments, lesion registration may comprise shifting, scaling, shearing, or skewing images to match different images of the same organ taken over time. To reduce the amount of the required non-linear distortion (which also distorts lesion volumes) and speed up computations, the neural network processing system 120 may register lesions on the per-organ basis instead of the per-scan basis. In particular embodiments, the neural network processing system may first segment all organs of interest using the segmentation model disclosed herein. The neural network processing system may then segment lesions on the per-organ basis. To avoid registration bias due to possible large lesion changes in between timepoints, the neural network processing system 120 may mask out (i.e., disregard during registration calculations) the lesions tissue for both timepoints. In particular embodiments, the neural network processing system 120 may then register the remaining healthy tissues of the organ using affine registration and coarse (e.g., 5 cm support grid) non-linear registration. The neural network processing system 120 may use the found mapping to register lesions in the organ between the two timepoints. In particular embodiments, the neural network processing system 120 may repeat for all timepoints using screening as the reference timepoint.

In particular embodiments, the first scan image may be associated with a first timepoint. A first fine segmentation of the one or more fine segmentations corresponding to a first organ of the one or more organs may portray one or more first lesions within the first organ. The neural network processing system 120 may access a second scan image from the set of CT scan images. The second scan image may be associated with a second timepoint. The second scan image may comprise a portion portraying the first organ. In particular embodiments, the neural network processing system 120 may determine a second fine segmentation corresponding to the first organ portrayed in the second scan image. The second fine segmentation may portray one or more second lesions within the first organ. The neural network processing system 120 may further determine a lesion registration based on a comparison between the one or more first lesions and the one or more second lesions.

Figure 15:
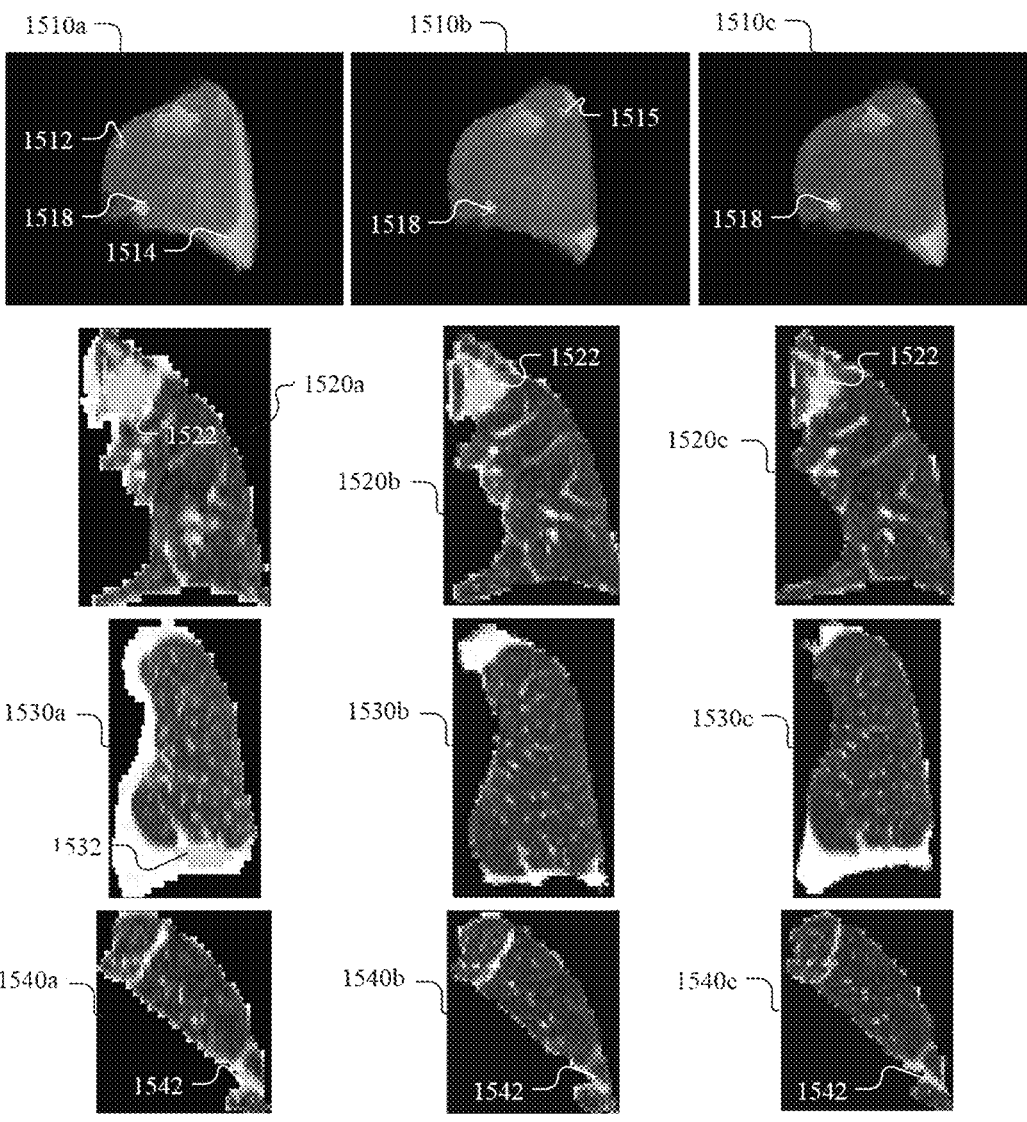
FIG. 15 illustrates example lesion registrations based on organ segmentation.

FIG. 15 illustrates example lesion registrations based on organ segmentation. The first column comprises images of segmented organs from CT scan images from the initial screening. For example, image 1510a corresponds to a first organ, image 1520a corresponds to a second organ, image 1530a corresponds to a third organ, and image 1540a corresponds to a fourth organ. The second column comprises images of segmented organs from CT scan images at week 6 for lesion registration. The third column comprises images of segmented organs from CT scan images at week 12 for lesion registration. As can be seen from the comparison between image 1510b and image 1510a, two of the tumors (i.e., tumor 1512 and tumor 1514) from the initial screening may have disappeared where there is also a new tumor 1515 developed. Tumor 1518 may have shrunken. As can be seen from the comparison between image 1510c and image 1510b, tumor 1515 may have disappeared. As can be seen from the comparison between image 1520c, image 1520b and image 1520a, tumor 1522 may have continuously shrunken from the initial screening to week 6, and to week 12. As can be seen from the comparison between image 1530c, image 1530b and image 1530a, tumor 1532 may have disappeared at week 6 and at week 12. As can be seen from the comparison between image 1540b and image 1540a, tumor 1542 may have shrunken from the initial screening to week 6. However, the comparison between image 1540c and image 1540b, tumor 1542 may have grown again.

FIG. 16 illustrates an example method 1600 for organ segmentation. The method may begin at step 1610, where the neural network processing system 120 may access a first scan image from a set of computed tomography (CT) scan images, wherein each CT scan image is at a first resolution. At step 1620, the neural network processing system 120 may generate a first downscaled image of the first scan image by resampling the first scan image to a second resolution, wherein the second resolution is lower than the first resolution. At step 1630, the neural network processing system

120 may determine, by one or more first machine-learning models based on the first downscaled image, one or more coarse segmentations corresponding to one or more organs portrayed in the first scan image, respectively, wherein at least one of the first machine-learning models is based on a neural network model, wherein at least one of the first machine-learning models is based on an ensemble model of two or more neural network models, and wherein at least one of the first machine-learning models is based on a distillation model of the ensemble model.

At step 1640, the neural network processing system 120 may determine, for each of the one or more coarse segmentations, a region of interest associated with the corresponding organ. At step 1650, the neural network processing system 120 may extract one or more segments of the first scan image based on the one or more coarse segmentations and their respective region of interests, wherein each extracted segment is at the first resolution. At step 1660, the neural network processing system 120 may determine, by one or more second machine-learning models based on the one or more extracted segments of the first scan image, one or more fine segmentations corresponding to the respective one or more organs portrayed in the extracted segments, wherein at least one of the second machine-learning models is based on a neural network model, wherein at least one of the second machine-learning models is based on an ensemble model of two or more neural network models, and wherein at least one of the second machine-learning models is based on a distillation model of the ensemble model.

At step 1670, the neural network processing system 120 may map the one or more fine segmentations to the first scan image, wherein the mapping comprises identifying one or more organ intersections, wherein each of the one or more organ intersections comprises a plurality of voxels, wherein each of the plurality of voxels is associated with two or more labels indicating two or more organs, respectively, and wherein each of the two or more labels is associated with a respective probability score, and resolving each of the one or more organ intersections by assigning, to each of the plurality of voxels within the organ intersection, a label indicating one of the two or more organs that is associated with the highest probability score. At step 1680, the neural network processing system 120 may generate a segmented image of the first scan image based on the one or more fine segmentations and the mapping, wherein the segmented image comprises one or more confirmed segmentations corresponding to the one or more organs.

Particular embodiments may repeat one or more steps of the method of FIG. 16, where appropriate. Although this disclosure describes and illustrates particular steps of the method of FIG. 16 as occurring in a particular order, this disclosure contemplates any suitable steps of the method of FIG. 16 occurring in any suitable order. Moreover, although this disclosure describes and illustrates an example method for organ segmentation, including the particular steps of the method of FIG. 16, this disclosure contemplates any suitable method for organ segmentation, including any suitable steps, which may include all, some, or none of the steps of the method of FIG. 16, where appropriate. Furthermore, although this disclosure describes and illustrates particular components, devices, or systems carrying out particular steps of the method of FIG. 16, this disclosure contemplates any suitable combination of any suitable components, devices, or systems carrying out any suitable steps of the method of FIG. 16.

Figure 17:
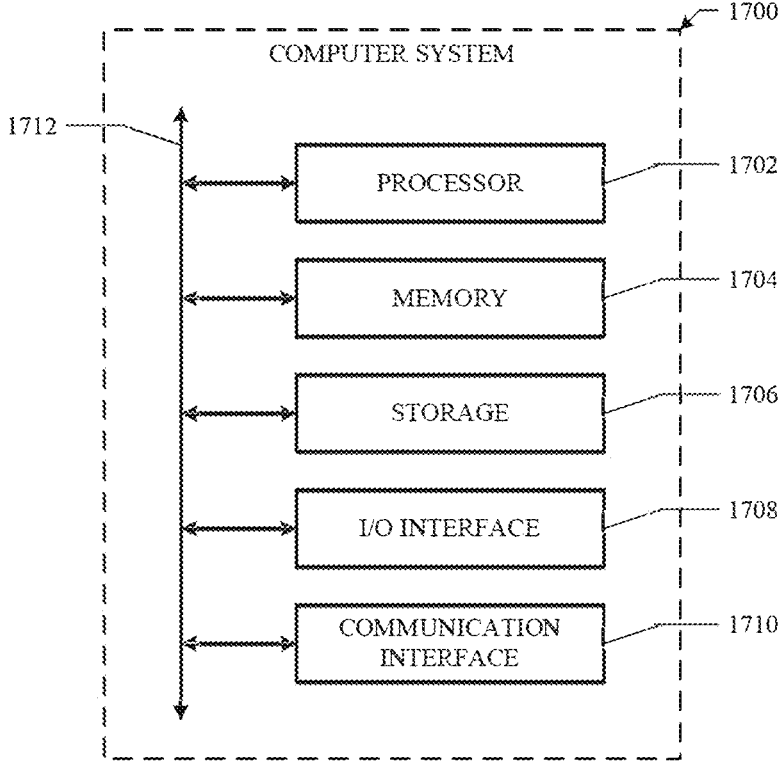
FIG. 17 illustrates an example of a computing system.

FIG. 17 illustrates an example computer system 1700. In particular embodiments, one or more computer systems 1700 perform one or more steps of one or more methods described or illustrated herein. In particular embodiments, one or more computer systems 1700 provide functionality described or illustrated herein. In particular embodiments, software running on one or more computer systems 1700 performs one or more steps of one or more methods described or illustrated herein or provides functionality described or illustrated herein. Particular embodiments include one or more portions of one or more computer systems 1700. Herein, reference to a computer system may encompass a computing device, and vice versa, where appropriate. Moreover, reference to a computer system may encompass one or more computer systems, where appropriate.

This disclosure contemplates any suitable number of computer systems 1700. This disclosure contemplates computer system 1700 taking any suitable physical form. As example and not by way of limitation, computer system 1700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1700 may include one or more computer systems 1700; be unitary or distributed; span multiple locations; span multiple machines; span multiple data centers; or reside in a cloud, which may include one or more cloud components in one or more networks. Where appropriate, one or more computer systems 1700 may perform without substantial spatial or temporal limitation one or more steps of one or more methods described or illustrated herein. As an example and not by way of limitation, one or more computer systems 1700 may perform in real time or in batch mode one or more steps of one or more methods described or illustrated herein. One or more computer systems 1700 may perform at different times or at different locations one or more steps of one or more methods described or illustrated herein, where appropriate.

In particular embodiments, computer system 1700 includes a processor 1702, memory 1704, storage 1706, an input/output (I/O) interface 1708, a communication interface 1710, and a bus 1712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1702 includes hardware for executing instructions, such as those making up a computer program. As an example and not by way of limitation, to execute instructions, processor 1702 may retrieve (or fetch) the instructions from an internal register, an internal cache, memory 1704, or storage 1706; decode and execute them; and then write one or more results to an internal register, an internal cache, memory 1704, or storage 1706. In particular embodiments, processor 1702 may include one or more internal caches for data, instructions, or addresses. This disclosure contemplates processor 1702 including any suitable number of any suitable internal caches, where appropriate. As an example and not by way of limitation, processor 1702 may include one or more instruction caches, one or more data caches, and one or more translation lookaside buffers (TLBs). Instructions in the instruction caches may be copies of instructions in memory 1704 or storage 1706, and the instruction caches may speed up retrieval of those instructions by processor 1702.

Data in the data caches may be copies of data in memory 1704 or storage 1706 for instructions executing at processor 1702 to operate on; the results of previous instructions executed at processor 1702 for access by subsequent instructions executing at processor 1702 or for writing to memory 1704 or storage 1706; or other suitable data. The data caches may speed up read or write operations by processor 1702. The TLBs may speed up virtual-address translation for processor 1702. In particular embodiments, processor 1702 may include one or more internal registers for data, instructions, or addresses. This disclosure contemplates processor 1702 including any suitable number of any suitable internal registers, where appropriate. Where appropriate, processor 1702 may include one or more arithmetic logic units (ALUs); be a multi-core processor; or include one or more processors 1702. Although this disclosure describes and illustrates a particular processor, this disclosure contemplates any suitable processor.

In particular embodiments, memory 1704 includes main memory for storing instructions for processor 1702 to execute or data for processor 1702 to operate on. As an example and not by way of limitation, computer system 1700 may load instructions from storage 1706 or another source (such as, for example, another computer system 1700) to memory 1704. Processor 1702 may then load the instructions from memory 1704 to an internal register or internal cache. To execute the instructions, processor 1702 may retrieve the instructions from the internal register or internal cache and decode them. During or after execution of the instructions, processor 1702 may write one or more results (which may be intermediate or final results) to the internal register or internal cache. Processor 1702 may then write one or more of those results to memory 1704.

In particular embodiments, processor 1702 executes only instructions in one or more internal registers or internal caches or in memory 1704 (as opposed to storage 1706 or elsewhere) and operates only on data in one or more internal registers or internal caches or in memory 1704 (as opposed to storage 1706 or elsewhere). One or more memory buses (which may each include an address bus and a data bus) may couple processor 1702 to memory 1704. Bus 1712 may include one or more memory buses, as described below. In particular embodiments, one or more memory management units (MMUs) reside between processor 1702 and memory 1704 and facilitate accesses to memory 1704 requested by processor 1702. In particular embodiments, memory 1704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1704 may include one or more memories 1704, where appropriate. Although this disclosure describes and illustrates particular memory, this disclosure contemplates any suitable memory.

In particular embodiments, storage 1706 includes mass storage for data or instructions. As an example and not by way of limitation, storage 1706 may include a hard disk drive (HDD), a floppy disk drive, flash memory, an optical disc, a magneto-optical disc, magnetic tape, or a Universal Serial Bus (USB) drive or a combination of two or more of these. Storage 1706 may include removable or non-removable (or fixed) media, where appropriate. Storage 1706 may be internal or external to computer system 1700, where appropriate. In particular embodiments, storage 1706 is non-volatile, solid-state memory. In particular embodiments, storage 1706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1706 taking any suitable physical form. Storage 1706 may include one or more storage control units facilitating communication between processor 1702 and storage 1706, where appropriate. Where appropriate, storage 1706 may include one or more storages 1706. Although this disclosure describes and illustrates particular storage, this disclosure contemplates any suitable storage.

In particular embodiments, I/O interface 1708 includes hardware, software, or both, providing one or more interfaces for communication between computer system 1700 and one or more I/O devices. Computer system 1700 may include one or more of these I/O devices, where appropriate. One or more of these I/O devices may enable communication between a person and computer system 1700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1708 for them. Where appropriate, I/O interface 1708 may include one or more device or software drivers enabling processor 1702 to drive one or more of these I/O devices. I/O interface 1708 may include one or more I/O interfaces 1708, where appropriate. Although this disclosure describes and illustrates a particular I/O interface, this disclosure contemplates any suitable I/O interface.

In particular embodiments, communication interface 1710 includes hardware, software, or both providing one or more interfaces for communication (such as, for example, packet-based communication) between computer system 1700 and one or more other computer systems 1700 or one or more networks. As an example and not by way of limitation, communication interface 1710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1710 for it. As an example and not by way of limitation, computer system 1700 may communicate with an ad hoc network, a personal area network (PAN), a local area network (LAN), a wide area network (WAN), a metropolitan area network (MAN), or one or more portions of the Internet or a combination of two or more of these.

One or more portions of one or more of these networks may be wired or wireless. As an example, computer system 1700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1700 may include any suitable communication interface 1710 for any of these networks, where appropriate. Communication interface 1710 may include one or more communication interfaces 1710, where appropriate. Although this disclosure describes and illustrates a particular communication interface, this disclosure contemplates any suitable communication interface.

In particular embodiments, bus 1712 includes hardware, software, or both coupling components of computer system 1700 to each other. As an example and not by way of limitation, bus 1712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1712 may include one or more buses 1712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

EMBODIMENTS

Among the provided embodiments are:

1. A method comprising, by one or more computing systems:

accessing a first scan image from a set of computed tomography (CT) scan images, wherein each CT scan image is at a first resolution;

generating a first downscaled image of the first scan image by resampling the first scan image to a second resolution, wherein the second resolution is lower than the first resolution;

determining, by one or more first machine-learning models based on the first downscaled image, one or more coarse segmentations corresponding to one or more organs portrayed in the first scan image, respectively;

extracting one or more segments of the first scan image based on the one or more coarse segmentations, respectively, wherein each extracted segment is at the first resolution;

determining, by one or more second machine-learning models based on the one or more extracted segments of the first scan image, one or more fine segmentations corresponding to the respective one or more organs portrayed in the extracted segments; and generating a segmented image of the first scan image based on the one or more fine segmentations, wherein the segmented image comprises one or more confirmed segmentations corresponding to the one or more organs.

2. The method of Embodiment 1, further comprising:

detecting one or more portions of the first scan image that each portrays one or more of air or a part of a CT scanner associated with the CT scan images;

removing the detected one or more portions from the first scan image.

3. The method of any of Embodiments 1-2, further comprising:

determining, for each of the one or more coarse segmentations, a region of interest associated with the corresponding organ, wherein extracting the one or more segments of the first scan image is further based on the respective region of interests associated with the one or more coarse segmentations.

4. The method of any of Embodiments 1-3, further comprising:

mapping the one or more fine segmentations to the first scan image, wherein generating the segmented image of the first scan image is further based on the mapping.

5. The method of any of Embodiments 1-4, wherein mapping the one or more fine segmentations to the first scan image comprises:

identifying one or more organ intersections, wherein each of the one or more organ intersections comprises a plurality of voxels, wherein each of the plurality of voxels is associated with two or more labels indicating two or more organs, respectively, and wherein each of the two or more labels is associated with a respective probability score; and resolving each of the one or more organ intersections by assigning, to each of the plurality of voxels within the organ intersection, a label indicating one of the two or more organs that is associated with the highest probability score.

6. The method of any of Embodiments 1-5, wherein the first scan image portrays a first portion of a torso, wherein the segmented image of the first scan image comprises a first confirmed segmentation of the one or more confirmed segmentations corresponding to a first organ of the one or more organs, wherein the first scan image is associated with a juxtaposition line, and wherein the method further comprises:

accessing a second scan image from the set of CT scan images, wherein the second scan image portrays a second portion of the torso, and wherein the second scan image is associated with the juxtaposition line;

generating a segmented image of the second scan image, wherein the segmented image of the second scan image comprises a second confirmed segmentation corresponding to the first organ;

determining a contrast mismatch between the first confirmed segmentation and the second confirmed segmentation, wherein the first confirmed segmentation and the second confirmed segmentation are on different sides of the juxtaposition line;

equalizing the contrast mismatch based on CT values associated with the first confirmed segmentation and CT values associated with the second confirmed segmentation; and stitching the segmented image of the first scan image and the segmented image of the second scan image based on the equalized contrast mismatch along the juxtaposition line.

7. The method of any of Embodiments 1-6, wherein a first organ of the one or more organs comprises air, wherein the first organ comprises a first air passage, and wherein the method further comprises:

identifying a convex hull associated with the first organ within the segmented image of the first scan image;

identifying one or more air volumes within the convex hull; and determining the first air passage based on a largest air volume of the one or more air volumes.

8. The method of any of Embodiments 1-7, further comprising:

accessing one or more second scan images of the set of computed tomography (CT) scan images;

generating one or more segmented images of the one or more second scan images, respectively, wherein each of the one or more segmented images of the one or more second scan images comprises one or more confirmed segmentations corresponding to the one or more organs; and generating a three-dimensional (3D) segmented image based on the segmented image of the first scan image and the one or more segmented images of the respective one or more second scan images, wherein the 3D segmented image comprises one or more 3D segmentations corresponding to the one or more organs.

9. The method of any of Embodiments 1-8, wherein at least one of the first or second machine-learning models is based on a neural network model, wherein at least one of the first or second machine-learning models is based on an ensemble model of two or more neural network models, and wherein at least one of the first or second machine-learning models is based on a distillation model of the ensemble model.

10. The method of Embodiments 1-9, wherein each of the neural network model and the ensemble model is trained based on ground-truth segmentation labels associated with the one or more organs, and wherein the distillation model is trained based on output from the ensemble model.

11. The method of any of Embodiments 1-10, wherein the first scan image is associated with a first timepoint, wherein a first fine segmentation of the one or more fine segmentations corresponding to a first organ of the one or more organs portrays one or more first lesions within the first organ, and wherein the method further comprises:

accessing a second scan image from the set of CT scan images, wherein the second scan image is associated with a second timepoint, wherein the second scan image comprises a portion portraying the first organ;

determining a second fine segmentation corresponding to the first organ portrayed in the second scan image, wherein the second fine segmentation portrays one or more second lesions within the first organ; and determining a lesion registration based on a comparison between the one or more first lesions and the one or more second lesions.

12. One or more computer-readable non-transitory storage media embodying software that is operable, when executed by one or more processors, to perform the steps of any of Embodiments 1 to 11.

13. A system comprising: one or more processors; and a non-transitory memory coupled to the processors comprising instructions executable by the one or more processors, the one or more processors operable when executing the instructions to perform the steps of any of Embodiments 1 to 11.

What is claimed is:

1. A method comprising, by one or more computing systems:

accessing a first scan image from a set of computed tomography (CT) scan images, wherein each CT scan image is at a first resolution;

detecting one or more portions of the first scan image that each portrays one or more of air or a part of a CT scanner associated with the set of CT scan images;

removing the detected one or more portions from the first scan image;

generating a first downscaled image of the first scan image by resampling the first scan image to a second resolution, wherein the second resolution is lower than the first resolution;

determining, by one or more first machine-learning models based on the first downscaled image, one or more coarse segmentations corresponding to one or more organs portrayed in the first scan image, respectively, wherein at least one of the first machine-learning models is based on a neural network model, wherein at least one of the first machine-learning models is based on an ensemble model of two or more neural network models, and wherein at least one of the first machine-learning models is based on a distillation model of the ensemble model;

determining, for each of the one or more coarse segmentations, a region of interest associated with the corresponding organ;

extracting one or more segments of the first scan image based on the one or more coarse segmentations and their respective region of interests, wherein each extracted segment is at the first resolution;

determining, by one or more second machine-learning
models based on the one or more extracted segments of
the first scan image, one or more fine segmentations
corresponding to the respective one or more organs
portrayed in the extracted segments, wherein at least
one of the second machine-learning models is based on
a neural network model, wherein at least one of the
second machine-learning models is based on an
ensemble model of two or more neural network mod-
els, and wherein at least one of the second machine-
learning models is based on a distillation model of the
ensemble model;
mapping the one or more fine segmentations to the first
scan image, wherein the mapping comprises:
identifying one or more organ intersections, wherein
each of the one or more organ intersections com-
prises a plurality of voxels, wherein each of the
plurality of voxels is associated with two or more
labels indicating two or more organs, respectively,
and wherein each of the two or more labels is
associated with a respective probability score, and
resolving each of the one or more organ intersections
by assigning, to each of the plurality of voxels within
the organ intersection, a label indicating one of the
two or more organs that is associated with the highest
probability score;
generating a segmented image of the first scan image
based on the one or more fine segmentations and the
mapping, wherein the segmented image comprises one
or more confirmed segmentations corresponding to the
one or more organs.

2. A method comprising, by one or more computing
systems:
accessing a first scan image from a set of computed
tomography (CT) scan images, wherein each CT scan
image is at a first resolution;
generating a first downscaled image of the first scan
image by resampling the first scan image to a second
resolution, wherein the second resolution is lower than
the first resolution;
determining, by one or more first machine-learning mod-
els based on the first downscaled image, one or more
coarse segmentations corresponding to one or more
organs portrayed in the first scan image, respectively;
extracting one or more segments of the first scan image
based on the one or more coarse segmentations, respec-
tively, wherein each extracted segment is at the first
resolution;
determining, by one or more second machine-learning
models based on the one or more extracted segments of
the first scan image, one or more fine segmentations
corresponding to the respective one or more organs
portrayed in the extracted segments; and
generating a segmented image of the first scan image
based on the one or more fine segmentations, wherein
the segmented image comprises one or more confirmed
segmentations corresponding to the one or more
organs.

3. The method of claim 2, further comprising:
detecting one or more portions of the first scan image that
each portrays one or more of air or a part of a CT
scanner associated with the CT scan images;
removing the detected one or more portions from the first
scan image.

4. The method of claim 2, further comprising:
determining, for each of the one or more coarse segmen-
tations, a region of interest associated with the corresponding organ, wherein extracting the one or more
segments of the first scan image is further based on the
respective region of interests associated with the one or
more coarse segmentations.

5. The method of claim 2, further comprising:
mapping the one or more fine segmentations to the first
scan image, wherein generating the segmented image
of the first scan image is further based on the mapping.

6. The method of claim 5, wherein mapping the one or
more fine segmentations to the first scan image comprises:
identifying one or more organ intersections, wherein each
of the one or more organ intersections comprises a
plurality of voxels, wherein each of the plurality of
voxels is associated with two or more labels indicating
two or more organs, respectively, and wherein each of
the two or more labels is associated with a respective
probability score; and
resolving each of the one or more organ intersections by
assigning, to each of the plurality of voxels within the
organ intersection, a label indicating one of the two or
more organs that is associated with the highest prob-
ability score.

7. The method of claim 2, wherein the first scan image
portrays a first portion of a torso, wherein the segmented
image of the first scan image comprises a first confirmed
segmentation of the one or more confirmed segmentations
corresponding to a first organ of the one or more organs,
wherein the first scan image is associated with a juxtaposi-
tion line, and wherein the method further comprises:
accessing a second scan image from the set of CT scan
images, wherein the second scan image portrays a
second portion of the torso, and wherein the second
scan image is associated with the juxtaposition line;
generating a segmented image of the second scan image,
wherein the segmented image of the second scan image
comprises a second confirmed segmentation corre-
sponding to the first organ;
determining a contrast mismatch between the first con-
firmed segmentation and the second confirmed seg-
mentation, wherein the first confirmed segmentation
and the second confirmed segmentation are on different
sides of the juxtaposition line;
equalizing the contrast mismatch based on CT values
associated with the first confirmed segmentation and
CT values associated with the second confirmed seg-
mentation; and
stitching the segmented image of the first scan image and
the segmented image of the second scan image based
on the equalized contrast mismatch along the juxtapo-
sition line.

8. The method of claim 2, wherein a first organ of the one
or more organs comprises air, wherein the first organ com-
prises a first air passage, and wherein the method further
comprises:
identifying a convex hull associated with the first organ
within the segmented image of the first scan image;
identifying one or more air volumes within the convex
hull; and
determining the first air passage based on a largest air
volume of the one or more air volumes.

9. The method of claim 2, further comprising:
accessing one or more second scan images of the set of
computed tomography (CT) scan images;
generating one or more segmented images of the one or
more second scan images, respectively, wherein each of
the one or more segmented images of the one or more second scan images comprises one or more confirmed segmentations corresponding to the one or more organs; and generating a three-dimensional (3D) segmented image based on the segmented image of the first scan image and the one or more segmented images of the respective one or more second scan images, wherein the 3D segmented image comprises one or more 3D segmentations corresponding to the one or more organs.

10. The method of claim 2, wherein at least one of the first or second machine-learning models is based on a neural network model, wherein at least one of the first or second machine-learning models is based on an ensemble model of two or more neural network models, and wherein at least one of the first or second machine-learning models is based on a distillation model of the ensemble model.

11. The method of claim 10, wherein each of the neural network model and the ensemble model is trained based on ground-truth segmentation labels associated with the one or more organs, and wherein the distillation model is trained based on output from the ensemble model.

12. The method of claim 2, wherein the first scan image is associated with a first timepoint, wherein a first fine segmentation of the one or more fine segmentations corresponding to a first organ of the one or more organs portrays one or more first lesions within the first organ, and wherein the method further comprises:

accessing a second scan image from the set of CT scan images, wherein the second scan image is associated with a second timepoint, wherein the second scan image comprises a portion portraying the first organ;

determining a second fine segmentation corresponding to the first organ portrayed in the second scan image, wherein the second fine segmentation portrays one or more second lesions within the first organ; and determining a lesion registration based on a comparison between the one or more first lesions and the one or more second lesions.

13. One or more computer-readable non-transitory storage media embodying software that is operable when executed to:

access a first scan image from a set of computed tomography (CT) scan images, wherein each CT scan image is at a first resolution;

generate a first downscaled image of the first scan image by resampling the first scan image to a second resolution, wherein the second resolution is lower than the first resolution;

determine, by one or more first machine-learning models based on the first downscaled image, one or more coarse segmentations corresponding to one or more organs portrayed in the first scan image, respectively;

extract one or more segments of the first scan image based on the one or more coarse segmentations, respectively, wherein each extracted segment is at the first resolution;

determine, by one or more second machine-learning models based on the one or more extracted segments of the first scan image, one or more fine segmentations corresponding to the respective one or more organs portrayed in the extracted segments; and generate a segmented image of the first scan image based on the one or more fine segmentations, wherein the segmented image comprises one or more confirmed segmentations corresponding to the one or more organs.

14. The media of claim 13, wherein the software is further operable when executed to:

detect one or more portions of the first scan image that each portrays one or more of air or a part of a CT scanner associated with the set of CT scan images;

remove the detected one or more portions from the first scan image.

15. The media of claim 13, wherein the software is further operable when executed to:

determine, for each of the one or more coarse segmentations, a region of interest associated with the corresponding organ, wherein extracting the one or more segments of the first scan image is further based on the respective region of interests associated with the one or more coarse segmentations.

16. The media of claim 13, wherein the software is further operable when executed to:

map the one or more fine segmentations to the first scan image, wherein generating the segmented image of the first scan image is further based on the mapping.

17. A system comprising: one or more processors; and a non-transitory memory coupled to the processors comprising instructions executable by the processors, the processors operable when executing the instructions to:

access a first scan image from a set of computed tomography (CT) scan images, wherein each CT scan image is at a first resolution;

generate a first downscaled image of the first scan image by resampling the first scan image to a second resolution, wherein the second resolution is lower than the first resolution;

determine, by one or more first machine-learning models based on the first downscaled image, one or more coarse segmentations corresponding to one or more organs portrayed in the first scan image, respectively;

extract one or more segments of the first scan image based on the one or more coarse segmentations, respectively, wherein each extracted segment is at the first resolution;

determine, by one or more second machine-learning models based on the one or more extracted segments of the first scan image, one or more fine segmentations corresponding to the respective one or more organs portrayed in the extracted segments; and generate a segmented image of the first scan image based on the one or more fine segmentations, wherein the segmented image comprises one or more confirmed segmentations corresponding to the one or more organs.

18. The system of claim 17, wherein the processors are further operable when executing the instructions to:

detect one or more portions of the first scan image that each portrays one or more of air or a part of a CT scanner associated with the set of CT scan images;

remove the detected one or more portions from the first scan image.

19. The system of claim 17, wherein the processors are further operable when executing the instructions to:

determine, for each of the one or more coarse segmentations, a region of interest associated with the corresponding organ, wherein extracting the one or more segments of the first scan image is further based on the respective region of interests associated with the one or more coarse segmentations.

20. The system of claim 17, wherein the processors are further operable when executing the instructions to:

map the one or more fine segmentations to the first scan image, wherein generating the segmented image of the first scan image is further based on the mapping.

\* \* \* \* \*